United States Patent
Ethier et al.

(10) Patent No.: US 11,680,522 B2
(45) Date of Patent: Jun. 20, 2023

(54) GAS TURBINE HEATER

(71) Applicant: Dynamo IP Holdings, LLC, Tomball, TX (US)

(72) Inventors: Jason How-Ring Ethier, Houston, TX (US); German Lakov, Brookline, MA (US); Ivan Wang, Pflugerville, TX (US)

(73) Assignee: Dynamo IP Holdings, LLC, Tomball, TX (US)

( * ) Notice: Subject to any disclaimer, the term of this patent is extended or adjusted under 35 U.S.C. 154(b) by 0 days.

(21) Appl. No.: 16/945,063

(22) Filed: Jul. 31, 2020

(65) Prior Publication Data
US 2021/0033024 A1 Feb. 4, 2021

Related U.S. Application Data

(60) Provisional application No. 62/882,286, filed on Aug. 2, 2019.

(51) Int. Cl.
*F02C 6/04* (2006.01)
*F02C 9/26* (2006.01)

(52) U.S. Cl.
CPC ............... *F02C 6/04* (2013.01); *F02C 9/263* (2013.01); *F05D 2220/32* (2013.01); *F05D 2220/60* (2013.01); *F05D 2270/313* (2013.01)

(58) Field of Classification Search
CPC .... F02C 6/04; F02C 6/18; F02C 9/263; F05D 2220/32; F05D 2220/60; F05D 2270/313
See application file for complete search history.

(56) References Cited

U.S. PATENT DOCUMENTS 4,754,607 A * 7/1988 Mackay .................... F23R 3/40
60/737
5,476,378 A * 12/1995 Zagoroff ................. F23D 14/36
431/352

(Continued)

FOREIGN PATENT DOCUMENTS

| EP | 1643085 A1 * | 4/2006 | .............. F01D 15/10 |
| WO | WO-9914071 A1 * | 3/1999 | ........... F01K 21/047 |
| WO | WO-03038347 A1 * | 5/2003 | ................ F02C 3/04 |

OTHER PUBLICATIONS

PCT/US2020/044461, Sep. 15, 2020, Invitation to Pay Additional Fees.

(Continued)

*Primary Examiner* — Craig Kim
(74) *Attorney, Agent, or Firm* — Keith B. Willhelm

(57) ABSTRACT

A direct-fired gas turbine heater comprises a gas turbine engine, a main blower that receives cold air from the ambient, a mixing plenum that receives cold air from the main blower and hot gas from the turbine and delivers warm air, an air blower plenum that that receives cold air from the main air blower and delivers air to the mixing plenum, and an air intake plenum that receives cold air from the ambient and the air blower plenum and delivers cold air to a turbine compressor, an air intake valve, and an air starter valve. The gas turbine engine comprises the compressor that receives cold air, a fuel manifold that receives combustible fuel, a combustor that receives compressed air from the compressor and fuel from the fuel manifold, a turbine that receives hot gas from the combustor, and a shaft connecting the compressor and turbine.

20 Claims, 20 Drawing Sheets

(56) References Cited

U.S. PATENT DOCUMENTS

| | | | | |
|---|---|---|---|---|
| 5,903,060 A * | 5/1999 | Norton | ................... | F02G 5/02 |
| | | | | 415/177 |
| 6,032,459 A * | 3/2000 | Skowronski | ............ | F01D 15/10 |
| | | | | 60/262 |
| 6,073,857 A * | 6/2000 | Gordon | ................... | F02C 3/14 |
| | | | | 237/13 |
| 2002/0095939 A1 * | 7/2002 | Gordon | ................... | F02C 6/18 |
| | | | | 60/734 |
| 2010/0024426 A1 * | 2/2010 | Varatharajan | ............. | F23R 3/34 |
| | | | | 60/737 |
| 2015/0322857 A1 * | 11/2015 | Ethier | ................... | F02C 7/224 |
| | | | | 290/46 |
| 2016/0376994 A1 * | 12/2016 | Kulkarni | ................... | F02C 7/18 |
| | | | | 60/39.5 |

OTHER PUBLICATIONS

Invitation to Pay Additional Fees for International Application No. PCT/US2020/044461, dated Sep. 15, 2020.

* cited by examiner

GAS TURBINE HEATER

CROSS-REFERENCE TO RELATED APPLICATIONS

This application claims the benefit under 35 U.S.C. § 119(e) to U.S. Provisional Application No. 62/882,286, filed on Aug. 2, 2019, the entire contents of which are incorporated herein by reference.

BACKGROUND INFORMATION

The oil and gas industry uses heaters for upstream and midstream applications, especially in very cold weather. The heaters may be air heaters or liquid heaters. Air heaters may heat up ambient air and deliver this air at high flow rates. The heated air may be directed at equipment in an open area or directed into an enclosed area. Liquid heaters may heat up glycol or hydraulic oil. The heated liquid may be sent into a heat exchanger for heating equipment or industrial fluids such as brine. These heaters are often mounted on a trailer such that they can be easily transported to different sites. Specific examples include heating up a pipeline compressor station and heating up pumping equipment on an oil well.

Gas turbine engine are less prevalent that reciprocating engines in the oil and gas industry. Gas turbine engines do have some advantages over reciprocating engines, including lower maintenance and increased fuel flexibility.

BRIEF SUMMARY OF THE DISCLOSURE

Gas Turbine Heater

This disclosure teaches a gas turbine heater that can be used in either portable or stationary applications. In one embodiment, a gas turbine heater includes a gas turbine engine that generates hot exhaust gas, an air blower that draws an amount of air flow from ambient, a mixing plenum that allows the gas turbine exhaust and ambient air flow to mix together to create warm air, and an outlet that delivers the warm air to the customer. In another embodiment, a gas turbine heater includes a gas turbine engine that generates hot exhaust gas, an air blower that draws an amount of air flow from ambient, an air-to-air heat exchanger that transfers heat from the gas turbine exhaust to the ambient air flow to create warm air, and an outlet that delivers the warm air to the customer. In another embodiment, a gas turbine heater includes a gas turbine engine that generates hot exhaust gas, a liquid pump that pumps hydraulic fluid from a reservoir, an air-to-liquid heat exchanger that transfers heat from the gas turbine exhaust to the hydraulic fluid to create heated hydraulic fluid, and an outlet that delivers the heated hydraulic fluid to the customer. Any of the embodiments may also include one or more of the following: one or more fuel manifolds to control fuel flow into the gas turbine engine; an electrical source to supply electrical power to the air blower; a controller to control the operation of the gas turbine heater including but not limited to fuel flow, air blower, and output flow rate and temperature; various sensors to evaluate operation of the gas turbine heater and provide inputs to the controller; an air starter device to start the gas turbine engine; a catalytic converter to reduce emissions from the gas turbine engine; baffles inside the mixing plenum that improve mixing of gas turbine exhaust and ambient air within the plenum; and a trailer upon which the gas turbine heater components may be mounted such that the gas turbine heater is towable and portable.

Existing heaters are typically driven by reciprocating engines. In many cases, the reciprocating engines drive mechanical devices to generate heat. Examples of such mechanical devices include a hydraulic fluid shear device and a magnetic heating device. As a result, existing heaters have more moving parts than the gas turbine heater. The reciprocating engine is also primarily sized for heat generation, because most of the shaft power is converted to heat.

The gas turbine heater has several advantages over existing heaters. The gas turbine heater is more reliable and has fewer failure points because it has fewer moving parts. The gas turbine heater requires less maintenance because it does not have reciprocating parts, unlike a conventional heater whose reciprocating engine requires maintenance every 500 hours.

Dual Fuel Gas Turbine Engine and a Combined Heat and Power Unit

This disclosure teaches a multi-fuel gas turbine engine that can burn gaseous fuels and liquid fuels. In one embodiment of a multi-fuel gas turbine engine, the engine includes a compressor and turbine on the same shaft, a multi-fuel combustor that receives and burns both gaseous fuels and liquid fuels either separately or concurrently, a gaseous fuel manifold that meters flow of a gaseous fuel into the combustor, a liquid fuel manifold that meters flow of a liquid fuel into the combustor, and a controller that commands set points to both the gaseous fuel manifold and liquid fuel manifold to maintain a desired set point of the gas turbine engine. In another embodiment of a multi-fuel gas turbine engine, the engine further includes an electric generator that is attached on the same shaft as the compressor and turbine. In another embodiment of a multi-fuel gas turbine engine, the engine further includes an electric generator that is attached to a second turbine on a second shaft.

This disclosure also teaches a gas turbine heater. In one embodiment, a gas turbine heater includes a gas turbine engine that generates power and hot exhaust gas, an air blower that is powered by the gas turbine engine and draws an amount of air flow from ambient, a mixing plenum that allows the gas turbine exhaust and ambient air flow to mix together to create warm air, an outlet that delivers the warm air to the customer, and devices such as flow diverters and electrical resistance heaters that provide additional control over the warm air output's flow rate and temperature. In another embodiment, a gas turbine heater includes a gas turbine engine that generates power and hot exhaust gas, an air blower that is powered by the gas turbine engine and draws an amount of air flow from ambient, an air-to-air heat exchanger that transfers heat from the gas turbine exhaust to the ambient air flow to create warm air, an outlet that delivers the warm air to the customer, and devices such as flow diverters and electrical resistance heaters that provide additional control over the warm air output's flow rate and temperature.

DETAILED DESCRIPTION

Direct Fired Gas Turbine Air Heater

Figure 1:
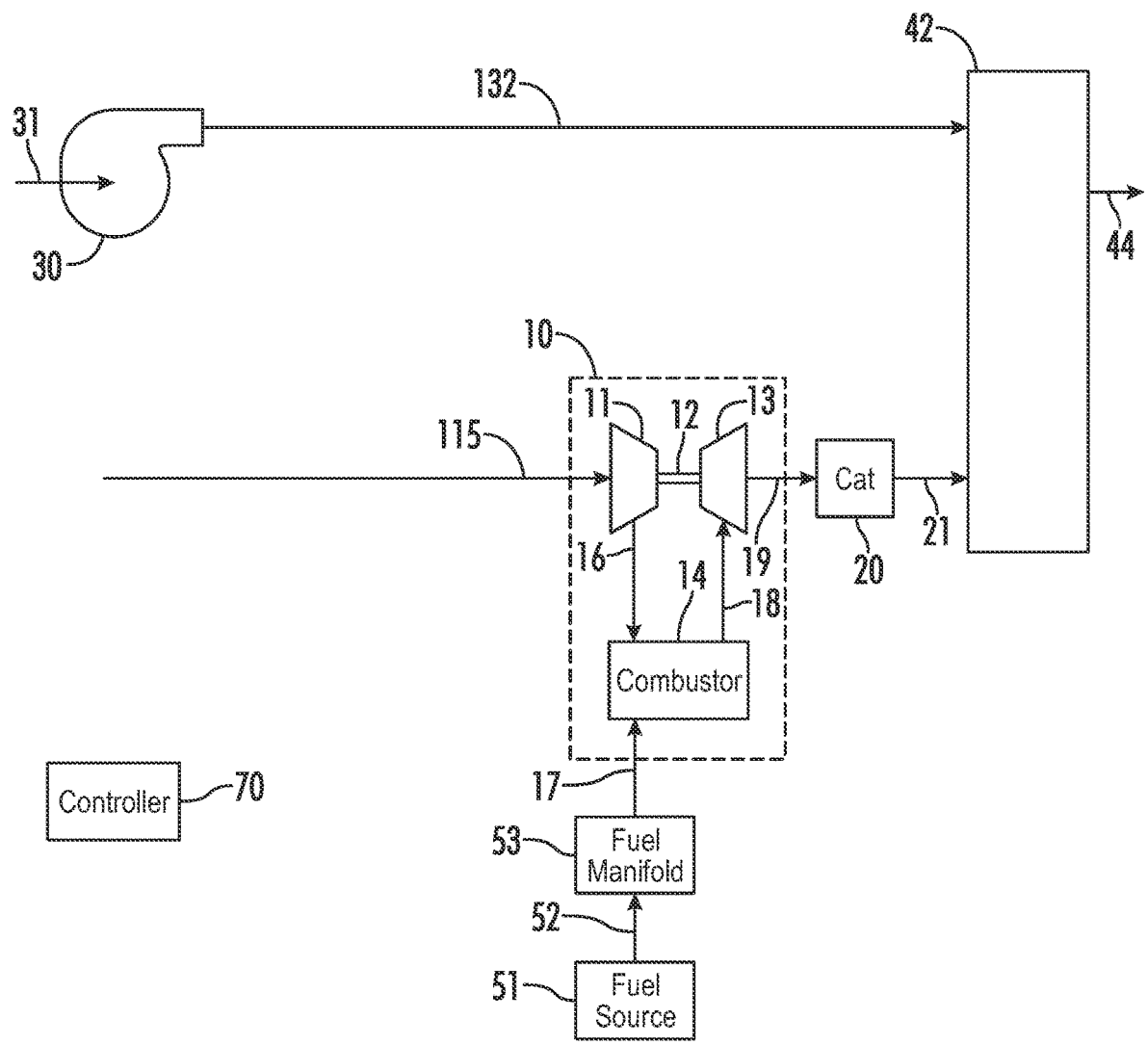
FIG. 1 A direct fired gas turbine heater.

One embodiment of the present disclosure is a direct fired gas turbine air heater. It is an air heater because it draws ambient air and heats up this ambient air. It is direct fired because the gas turbine exhaust and ambient air directly mix together to form the warm air at the heater output. First refer to FIG. 1, which shows a direct fired gas turbine air heater. It includes a gas turbine engine (10), a fuel manifold (53), an air blower (30), a mixing plenum (42), and a controller (70).

The gas turbine engine (10) operates as follows. During normal operation, the compressor (11) rotates, which draws ambient air (115) into the compressor. The rotation of the compressor increases the pressure of the air and delivers (16) this air to the combustor (14). The fuel manifold (53) draws fuel (52) from the fuel source (51) and controls the delivery of fuel (17) into the combustor (14). In one example, the fuel source may be a pressurized propane tank, in which case the propane naturally flows into the fuel manifold because the propane is at high pressure, and the fuel delivery may be controlled by a metering valve. In another example, the fuel source may be a diesel tank, in which case the fuel manifold may include a fuel pump to draw fuel from the fuel tank, and the fuel delivery may be controlled by a metering valve and an atomizing nozzle. The combustor receives both the pressurized air from the compressor and the fuel from the fuel manifold (53) in a proportion suitable for combustion. The combustor contains an igniter (not shown in the figure) that may be activated to ignite the air fuel mixture. The igniter may be a spark igniter that is powered by high voltage DC. Once ignition is achieved, the combustion may be sustained without further use of the igniter if air and fuel are continuously supplied to the combustor. The combustion produces gas (18) at high pressure and temperature. This gas is then delivered to the turbine (13), which is on the same shaft (12) as the compressor. The high pressure and high temperature gas transfers power to the turbine as it flows through the turbine, which in turns drives the compressor to draw in and pressurize ambient air. The gas then leaves (19) the turbine and enters a catalytic converter (20) to reduce emissions such as carbon monoxide and nitrogen oxides. The exhaust leaves (21) the catalytic converter and enters the mixing plenum (42). Note that the gas turbine heater does not need the catalytic converter to operate. The catalytic converter may be removed such that the turbine exhaust is delivered directly into the mixing plenum. Without the catalytic converter, the gas turbine exhaust may have greater emissions and the back pressure on the gas turbine is reduced, but it does not change the way that the gas turbine engine is controlled. An embodiment of a gas turbine engine may be a turbocharger and a combustor. The turbocharger includes a compressor and turbine on the same shaft, bearings to support the shaft, bearing housing, compressor housing, and turbine housing. The turbocharger has a compressor inlet, a compressor outlet, a turbine inlet, and a turbine outlet. The combustor may be a standalone combustor, which has a combustor inlet, a combustor outlet, one or more fuel inlets, and an igniter. For example, a standalone combustor may be a combustor that is not structurally or geometrically integrated with the compressor or turbine, that can mechanically stand on its own, and whose flow path can be integrated with the compressor and turbine flow paths by simple plumbing parts such as hoses, pipes, and pipe flanges. The inlets and outlets of the turbocharger and combustor would interface with each other according to the above descriptions in this paragraph and according to FIG. 1. Dividing one inlet or outlet into multiple inlets or outlets does not change the behavior of the gas turbine heater if the multiple inlets or outlets still follow the flow paths indicated in FIG. 1.

The rest of the gas turbine heater operates as follows. The air blower (30) may be one of several different types. For example, an axial fan or a centrifugal blower may be used as the air blower. In an embodiment in which the air blower is a centrifugal blower, the air blower rotates to draw in ambient air (31) and delivers air at an elevated pressure. The air is delivered (132) to an inlet of the mixing plenum (42). In FIG. 1, the ambient air (132) and gas turbine exhaust (21) enter the mixing plenum at different locations. They may also join before entering the mixing plenum without significantly affecting the gas turbine heater's operation or performance because there is not a significant pressure difference between the two entry points on the mixing plenum as shown in FIG. 1. In the mixing plenum, the ambient air and the gas turbine exhaust combine such that the temperature of the combined flow is a value between the temperatures of the individual flows. The combined flow leaves the mixing plenum as the heater output flow (44). Customers may use a combination of ducts, hoses, and splitters to route the output flow to desired locations. An embodiment of a gas turbine heater may desire a certain air flow rate at the heater output, and a final temperature at the heater output that is 100 degrees Celsius higher than the ambient temperature. A controller (70) may be used to control the heater output parameters. The controller may control the air blower (30), for example by adjusting the air blower rotational speed, to control air flow rate. The controller may also control the fuel manifold (53), for example by adjusting the set point of a metering valve in the fuel manifold, to control fuel flow rate (17) into the combustor, which will affect the output temperature.

Air Starter

The gas turbine engine requires a starting method, for which there are various options. One method is to spin up the gas turbine engine with a starter motor that is connected to the shaft of the gas turbine engine. Another method is to spin up the gas turbine engine with an air starter. In an embodiment of a gas turbine heater, the air blower may be used as an air starter for the gas turbine engine. This embodiment is described in FIG. 2. An air blower plenum (32) has three openings. The air blower (30) delivers ambient air flow (32) into the air blower plenum through one opening. The air blower plenum delivers ambient air (35) to the mixing plenum (42) through a second opening. The air blower plenum delivers ambient air (34) to a turbine intake plenum (38) through a third opening. The turbine intake plenum (38) has three openings. The turbine intake plenum receives ambient air (41) through one opening. The turbine intake plenum receives starting air (34) from the air blower plenum through a second opening; note that this is the same opening as described above in this paragraph when disclosing the air blower plenum. The turbine intake plenum delivers ambient air (15) to the gas turbine engine (10) through a third opening. The turbine intake plenum also has valves at the ambient air intake opening (40) and the starter air intake opening (39).

When the gas turbine heater is at rest, none of the components are moving. To start the gas turbine engine, first close the air intake valve (40) and open the air starter valve (39). Then turn on the air blower (30) to deliver air (32) to the air blower plenum (33). At this point, some of that air flow (35) will go to the mixing plenum (42), and some of that air flow (34) will go to the turbine intake plenum (38) because the air starter valve (39) is open. With the air intake valve (40) closed, all of the air that reaches the air intake plenum (38) will go into the gas turbine engine (10). This provides air flow into the gas turbine engine and begins to spin the gas turbine engine. An amount of fuel may be delivered (17) into the gas turbine engine to mix with the starting air, and the igniter may be activated to ignite the air fuel mixture and initiate combustion. For a specific starting air flow rate, the fuel flow may be tuned such that the resulting air fuel ratio gives reliable ignition. The starting air flow rate into the gas turbine engine may be controlled by changing the speed of the air blower, or by adjusting the ratio of flow areas between flow path (35) and flow path (34) in FIG. 2. Increasing the area of flow path (34) relative to flow path (35) will cause more air to go into the gas turbine engine.

After combustion is initiated, the amount of fuel delivered (17) into the gas turbine engine may be increased to spool up the gas turbine engine. At a certain operating point, for example upon reaching a certain gas turbine shaft speed, the gas turbine engine is self-sustaining and no longer needs the air starter flow (34). At this point, open the air intake valve (40) such that the gas turbine engine begins to draw in ambient air, and close the air starter valve (39) such that the gas turbine engine receives ambient air only from its own air intake (41). The gas turbine engine is now under self-sustaining operation and is operating independently from the air blower (30). The gas turbine heater is now in normal operating state. The flow rate and temperature at the heater output (44) may be controlled by adjusting the blower (for example by changing its speed) or by adjusting the gas turbine operating point (for example by changing the fuel flow rate).

Figure 2:
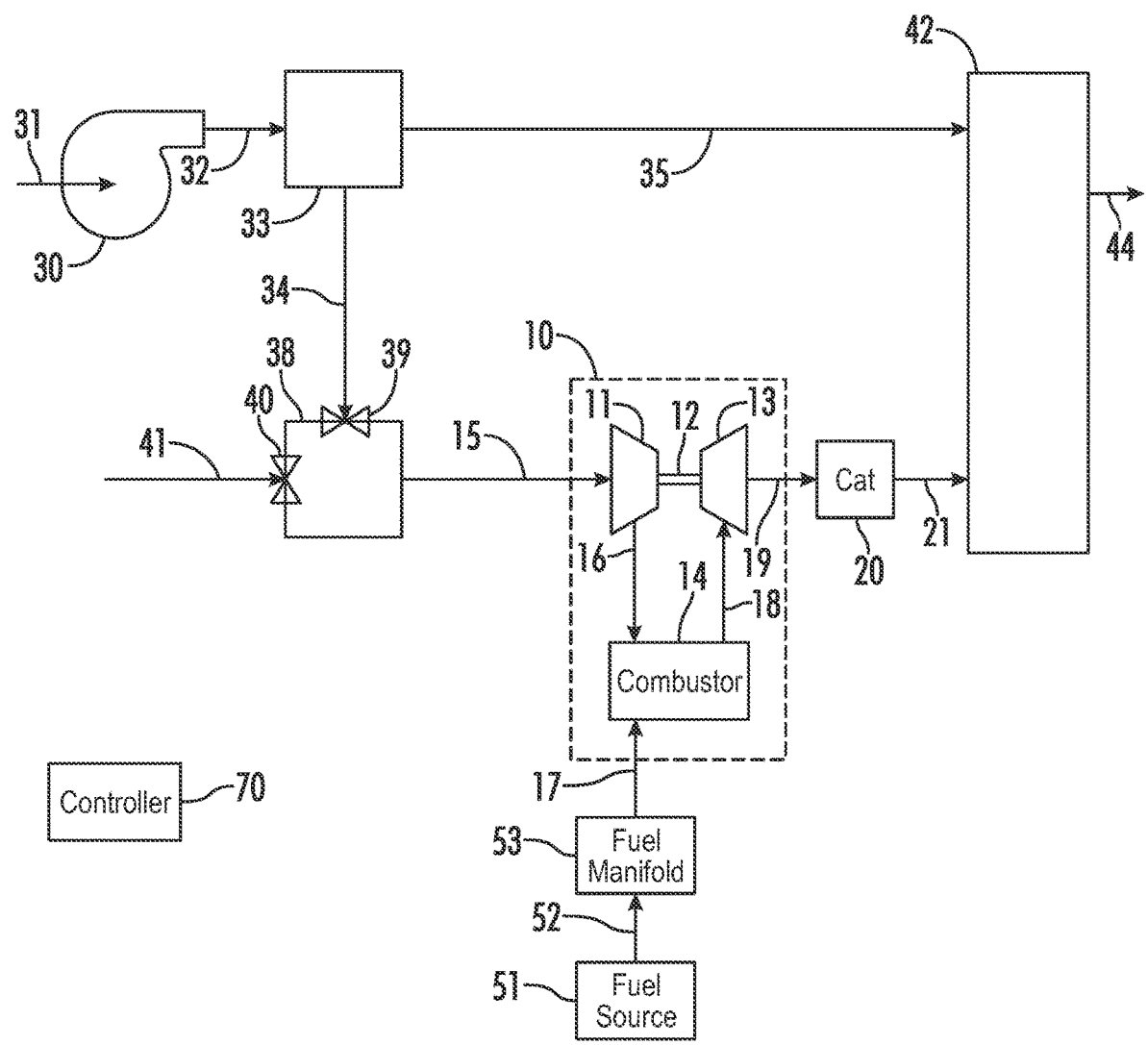
FIG. 2 A gas turbine heater that additionally includes an air starter mechanism that uses the air blower.

FIG. 2 shows an embodiment in which the air flow control valves (39) and (40) are on the turbine intake plenum. The valve position may be changed without affecting the operation of the gas turbine heater. The air starter valve (39) may be placed anywhere along flow path (34); the air intake valve (40) may be placed anywhere along flow path (41). The gas turbine engine may have an air filter, which is not shown in the figures. An advantageous location for the air filter is somewhere along flow path (15). This allows the air filter to filter air flow from both the turbine intake flow path (41) and the air starter flow path (34).

It is also possible to run the gas turbine engine without opening the air intake valve. Still referring to FIG. 2, after combustion is initiated, the amount of fuel delivered (17) into the gas turbine engine may be increased to spool up the gas turbine engine. At a certain operating point, for example upon reaching a certain gas turbine shaft speed, the gas turbine engine is self-sustaining and no longer needs the air starter flow (34). However, the air intake valve (40) may remain closed and the air starter valve (39) may remain open, such that the gas turbine engine is drawing cold air only from the air starter flow path (34). The flow rate and temperature at the heater output (44) may be controlled by adjusting the blower (for example by changing its speed) or by adjusting the gas turbine operating point (for example by changing the fuel flow rate). This may lead to lower temperature at the turbine inlet (18), which may be advantageous if this system is being operated in high ambient temperature. In this operating mode, the air intake valve (40) is not needed, and there is no additional air flow from ambient (41) going into the gas turbine engine.

Figure 3:
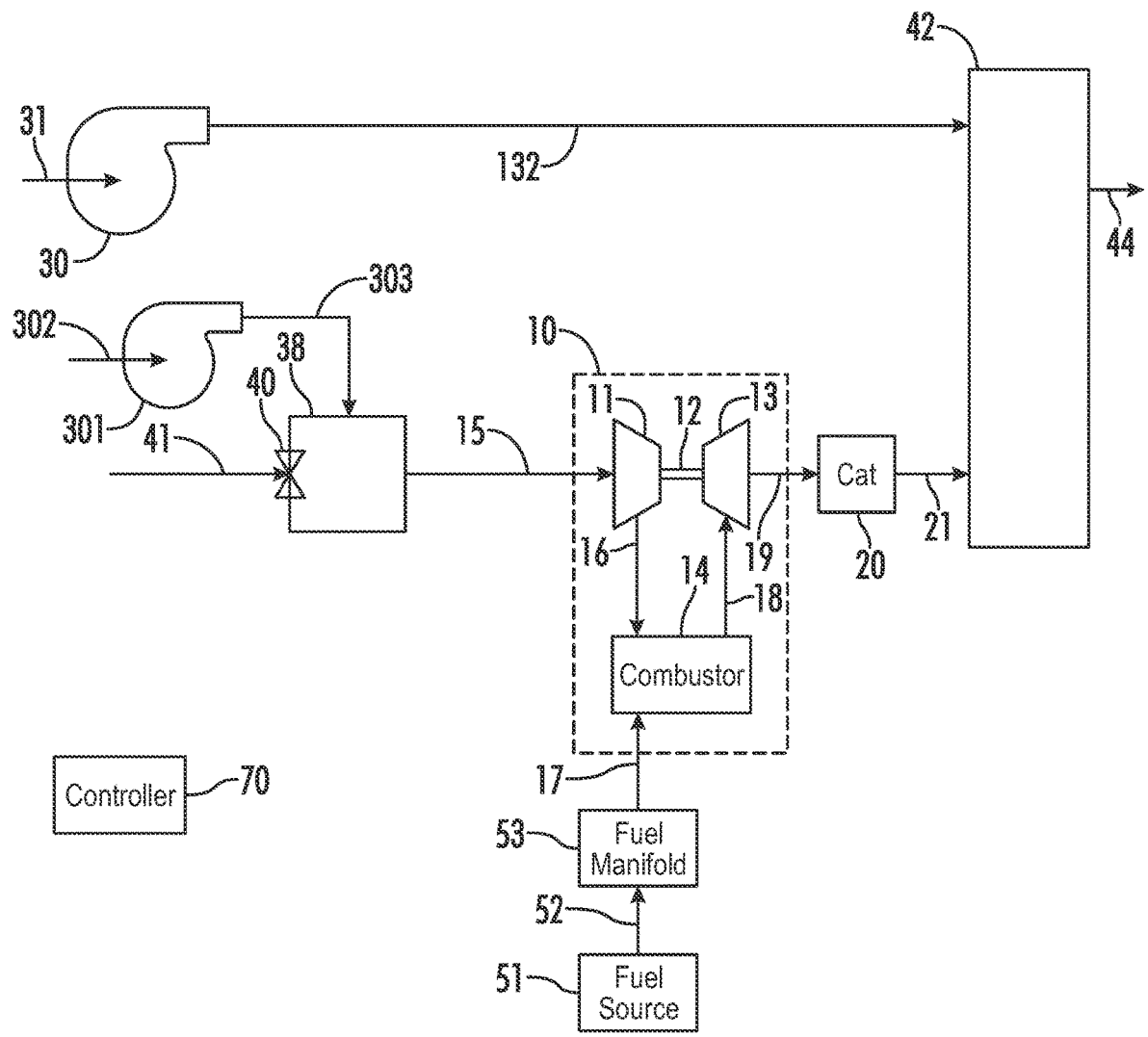
FIG. 3 A gas turbine heater that additionally includes an air starter mechanism that uses an air starter blower distinct from the main air blower.

In another embodiment of a gas turbine heater, the air starter may be a different air blower. This embodiment is shown in FIG. 3. When the gas turbine heater is at rest, none of the components are moving. To start the gas turbine engine, first close the air intake valve (40). Then turn on the air blower (30) to deliver air (132) to the mixing plenum (42). Also turn on the air starter blower (301) to draw air flow (302) from ambient and deliver this air flow (303) as starter air flow to the turbine intake plenum (38). With the air intake valve (40) closed, all of the air that reaches the air intake plenum (38) will go into the gas turbine engine (10). This provides air flow into the gas turbine engine and begins to spin the gas turbine engine. An amount of fuel may be delivered (17) into the gas turbine engine to mix with the starting air, and the igniter may be activated to ignite the air fuel mixture and initiate combustion.

After combustion is initiated, the amount of fuel delivered (17) into the gas turbine engine may be increased to spool up the gas turbine engine. At a certain operating point, for example upon reaching a certain gas turbine shaft speed, the gas turbine engine is self-sustaining and no longer needs the starter air flow (303). At this point, open the air intake valve (40) such that the gas turbine engine begins to draw in ambient air, and turn off the air starter blower (301) such that the gas turbine engine receives ambient air only under its own power. The suction generated at the compressor will draw air primarily from the turbine air intake (41), but the suction may also draw a smaller amount of air through the air starter path (303) because this path is not closed by a valve. A valve may be added for the air starter path (303) similar to the embodiment shown in FIG. 2, but the valve is not necessary. The air starter blower (301) may be sized to deliver a desired amount of starter air flow to the gas turbine engine.

Electric Power Source

Figure 4:
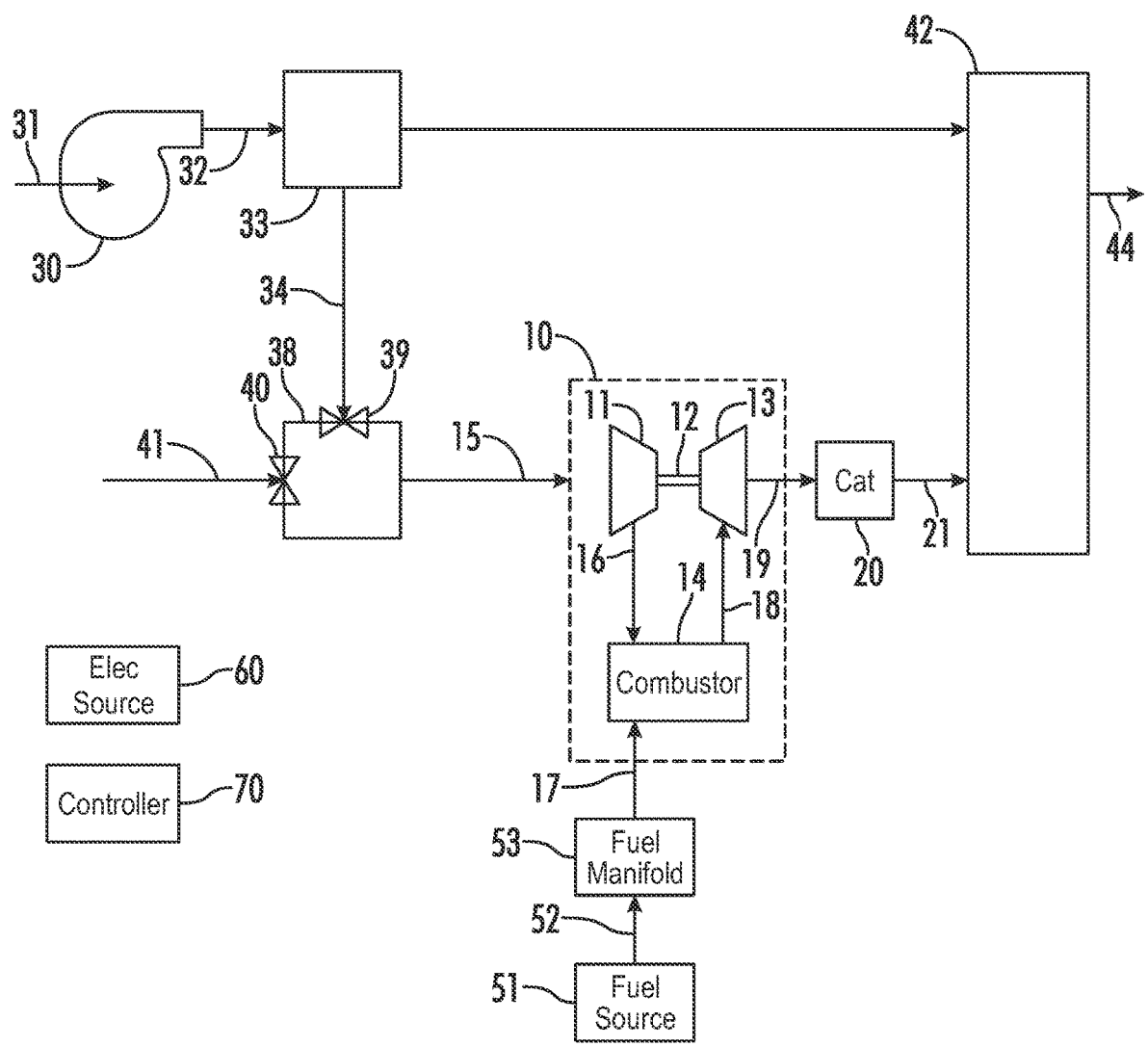
FIG. 4 A gas turbine heater that additionally includes a source of electric power.

In an embodiment of the gas turbine heater, the heater includes a source of electric power (60), as shown in FIG. 4. The electric power may be used to drive the air blower (30), the controller (70), the fuel manifold (53), and auxiliary systems not shown in the figures such as lubrication and cooling systems. The source of electric power may be from an external source, in which case the gas turbine heater may have an electrical connection such as a molded connector or simply studs onto which electrical wires may be secured. The source of electric power may also be from a generator that is a part of the gas turbine heater system, for example a diesel or natural gas genset that is on the skid or in the enclosure of the gas turbine heater.

Figure 5:
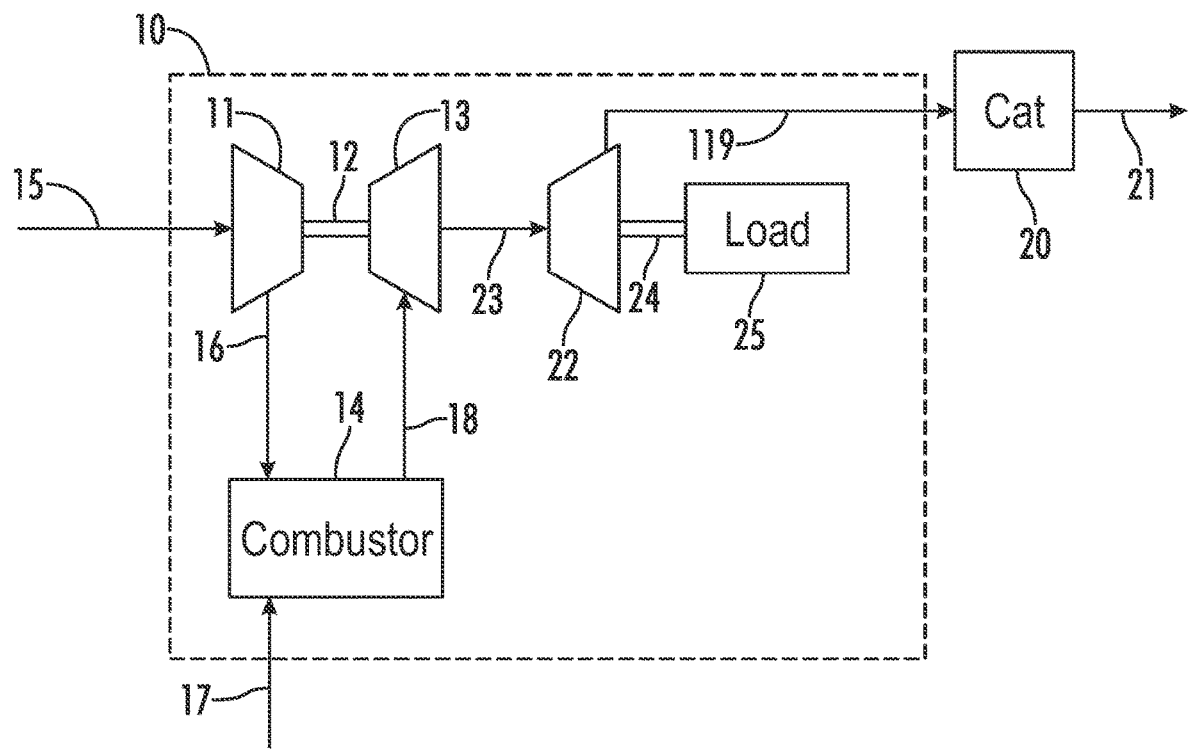
FIG. 5 A two-shaft gas turbine generator that is part of a gas turbine heater and provides a source of electric power for the gas turbine heater.

The gas turbine engine may also be a source of electric power. Refer to FIG. 5, which shows an embodiment of a gas turbine engine that is a two-shaft engine. In this gas turbine engine (10), a second turbine (22) receives gas (23) at high pressure and temperature from the first turbine (13). The second turbine (22) is attached to a load (25), for example a generator, by a shaft (24) that does not transmit any torque to the first shaft (12). The gas (23) spins the second turbine (22), which spins the generator (25) and generates electric power. The exhaust (119) may be directed into a catalytic converter (20) before entering the mixing plenum. There are also other embodiments of a gas turbine engine that generates power, such as a single-shaft engine with a generator attached to the shaft. Depending on the type of electric generator that is attached to the gas turbine engine, additional components may be required to generate useful power. For example, power electronics may be needed to regulate the power to an industry-standard voltage and frequency, or a gearbox may be needed between the second turbine and the generator if the two components are designed to rotate at significantly different speeds.

A single-shaft gas turbine generator may not require an air starter and may instead be started by first running the generator as a starter motor. A two-shaft gas turbine generator may still be started with an air starter. Using a gas turbine generator as the source of electric power in a gas turbine heater may affect how the heater output flow rate and temperature are controlled. In particular, the power output and heat output are no longer independent, so additional components may be required to increase the degrees of freedom in the system and allow greater control over heater output flow rate and temperature.

Control of Gas Turbine Heater

A gas turbine heater may include sensors and controllable components. The gas turbine heater's components may be controlled based on the heater's sensor readings in order to start the heater from rest, shut down the heater, and obtain the desired heater output flow rate and temperature during normal operation. The gas turbine heater may also be controlled for a variety of non-standard situations, including but not limited to adjusting to changes in ambient conditions, adjusting to changes in fuel, and shutting down in a controlled manner under fault conditions.

Figure 6:
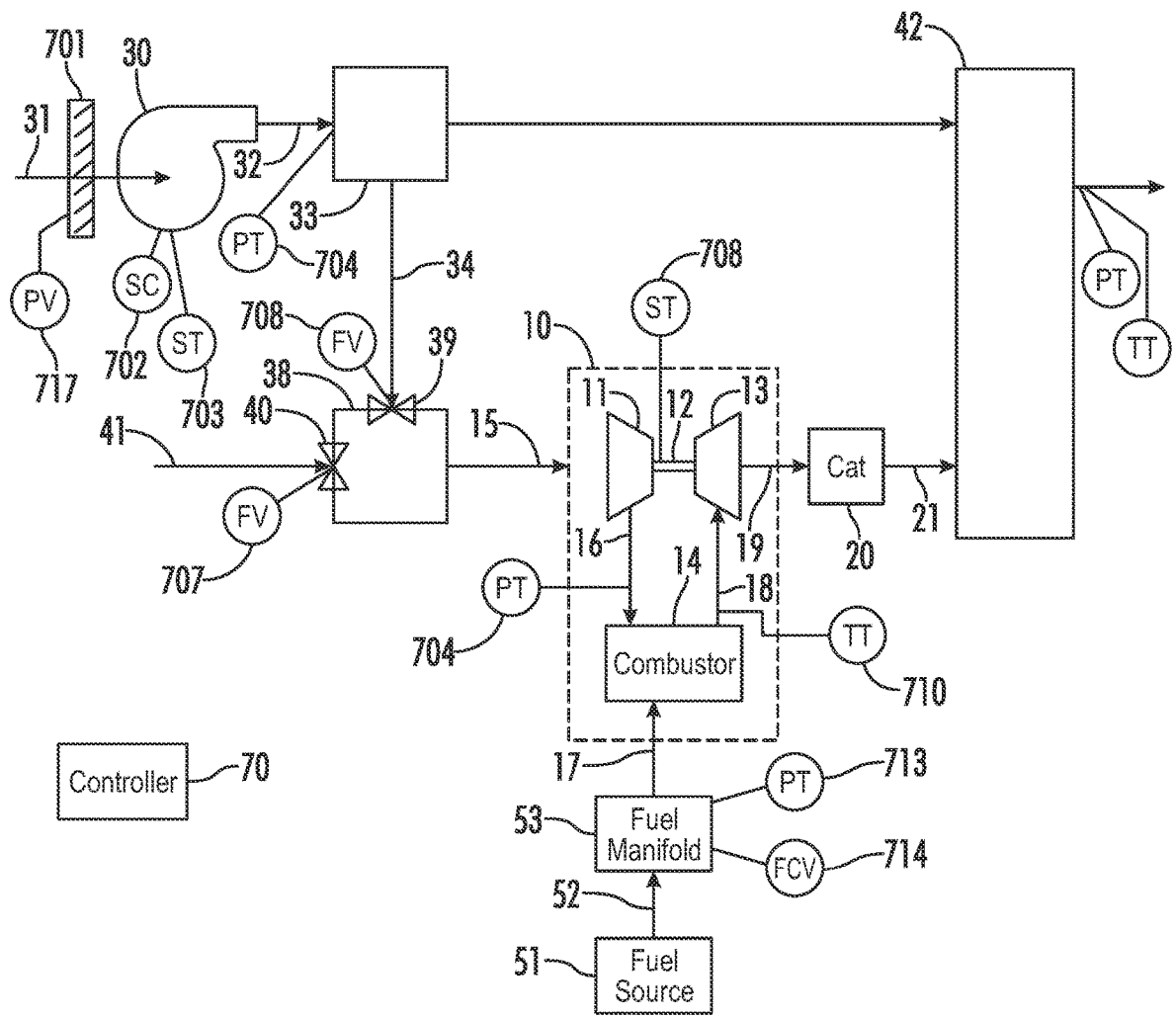
FIG. 6 A gas turbine heater including sensors and controllable components.

Refer to FIG. 6, which shows an embodiment of a gas turbine heater with sensors and controllable components. Suppose that the gas turbine heater begins at rest and the controller is commanded to start the gas turbine heater.

The controller (70) closes the air intake valve (40) via an air intake valve command (707), and the controller opens the air starter valve (39) via an air starter valve command (706). The two valves may be DC-motor-driven butterfly valves, such that the valve opens when receiving a positive voltage and the valve closes when receiving a negative voltage.

The controller also turns on the air blower (30) via an air blower speed command (702). This may be implemented as an AC-motor-driven air blower that is powered by a variable frequency drive (VFD); the controller may provide the air blower speed command to the VFD, and the VFD then provides power to the air blower motor based on the speed command. The controller may also measure the air blower speed signal (703). Alternatively, the air blower speed command (702) may just be an on/off signal, such that when the air blower is commanded on, the air blower receives power and rotates at a nominally rated speed. In the case that the air blower only runs at one speed, the air flow from the air blower may be adjusted by having a louver (701) at the air blower intake. The louver may also be controllable by an actuator that opens and closes the louver via a louver command (717).

When the air intake valve and air starter valve are positioned for air starting and the air blower is turned on, the air blower (30) builds pressure in the air blower plenum (33). Some of the air flow from the air blower plenum goes through the turbine intake plenum (38) and enters the gas turbine engine (10) via the compressor (11).

One method to check that the air starter valve (39) and the air intake valve (40) work properly by evaluating the air blower plenum pressure (704) is disclosed here. When the air blower (30) is running, actuating the air intake valve from a closed position to an open position will reduce the air blower plenum pressure because it reduces the flow restrictions downstream of the air blower by opening a new flow path to ambient. Similarly, actuating the air starter valve from an open position to a closed position will increase the air blower plenum pressure because it increases the flow restrictions downstream of the air blower by reducing the flow area at the air blower output.

When the air intake valve and air starter valve are positioned for air starting and the air blower is turned on, the controller may read the air blower plenum pressure signal (704) and the gas turbine shaft speed (708), both of which provide an estimate of the air flow going through the gas turbine engine. The controller then provides a small amount of fuel flow (17) into the combustor (14) via a fuel metering command (714) to the fuel manifold (53). One example of a fuel manifold includes a proportional valve that receives a PWM signal such that a stronger signal opens the valve more and allows more fuel into the combustor. When the air starter flow and the fuel flow mix in the combustor, the controller then provides a signal to turn on the igniter and initiates combustion. The air flow and fuel flow may need to be tuned to achieve an air fuel ratio that is conducive to ignition. For example, the air flow may be adjusted by adjusting the air blower speed command (702) or by adjusting the louver command (717). The fuel flow may be adjusted by adjusting the fuel metering command (714).

After ignition is achieved, the gas turbine speed (708) increases and the temperature (710) at the combustor exit (18) increases. The controller may evaluate successful ignition by monitoring the increase in these parameters before and after an ignition attempt. Alternatively, the combustor may include a sensor that directly detects flame, and the controller may evaluate successful ignition based on the output of that sensor.

The controller may then increase fuel flow into the combustor by increasing the fuel metering command to the fuel manifold. As fuel flow is increased, the gas turbine speed continues to increase until it reaches a range of speeds at which the gas turbine engine may operate in a self-sustaining state. At this point, the gas turbine engine no longer needs starter air from the air blower. The controller may open the air intake valve (40) and close the air starter valve (39) such that the gas turbine engine draws in ambient air (41) via the turbine intake plenum (38) and the air blower delivers all of its air flow to the mixing plenum (42).

At this point, the gas turbine heater is in normal operating state and is delivering heated air (44) to the customer. Increasing fuel flow into the gas turbine engine will increase heater output temperature and slightly increase heater output flow rate. Increasing air blower speed will increase heater output flow rate and slightly decrease heater output temperature. The customer may want a specific heater output temperature. The gas turbine heater may have a heater output temperature signal (712), for example by installing one or more thermocouples at the heater output.

Figure 7:
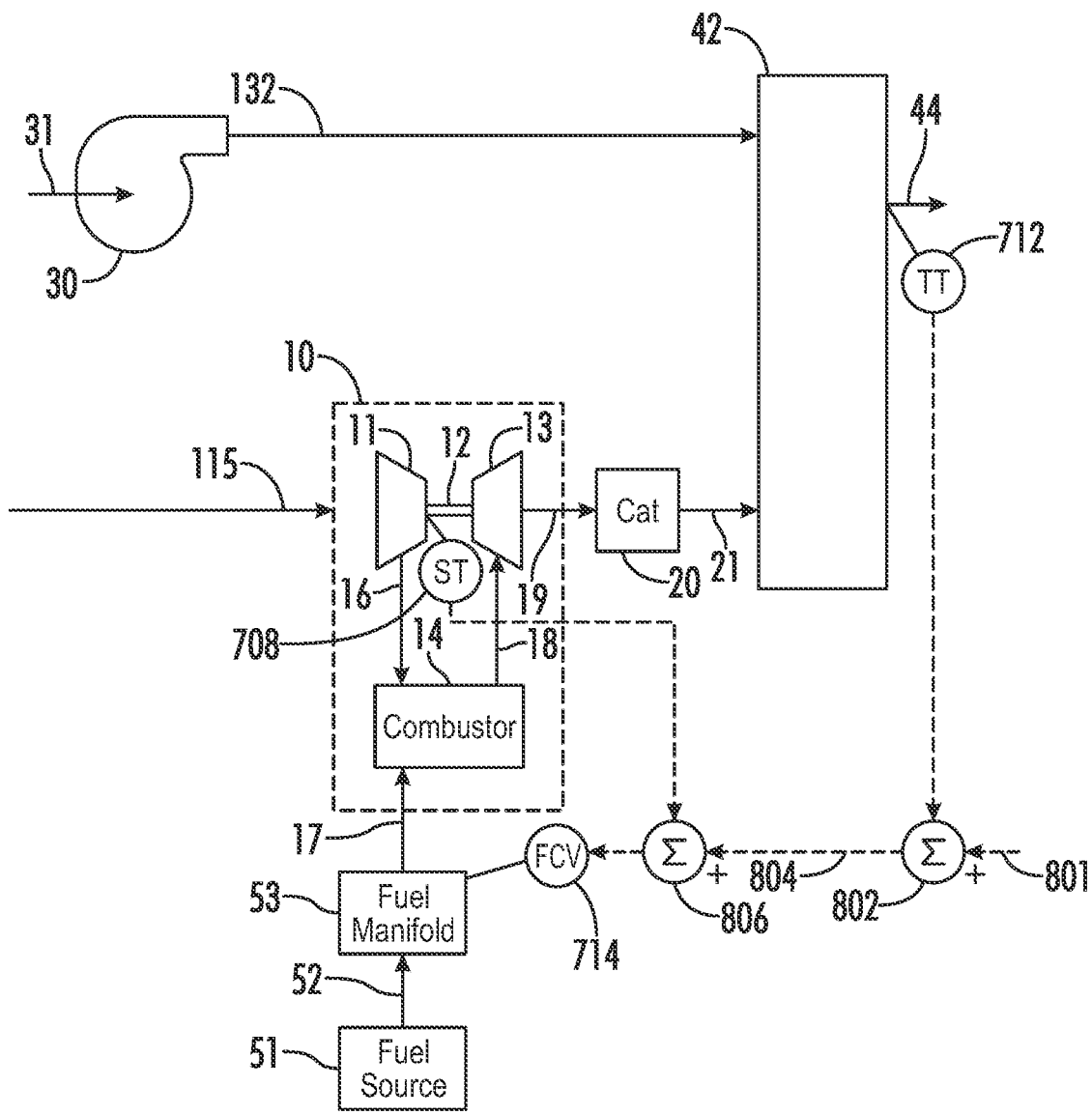
FIG. 7 Dual control loops for a gas turbine heater, where the control loops control for gas turbine shaft speed and heater output temperature.

Refer to FIG. 7 for a control loop diagram that describes how the controller may adjust the fuel metering command (714) to control the gas turbine shaft speed (708) and the heater output temperature (712). In normal operating state, the equipment operator may specify a heater output temperature set point (801). A first control loop (802) receives the set point (801) and the actual heater output temperature (712). The first control loop (802) uses some logic, for example PID control logic, to calculate a desired gas turbine shaft speed set point (804) based on the desired and actual heater output temperatures. A second control loop (806) receives the gas turbine shaft speed set point (804) and the actual gas turbine shaft speed (708). The second control loop (804) uses some logic, for example PID control logic, to calculate a fuel metering command (714) based on the desired and actual gas turbine shaft speeds. The fuel metering command (714) is then sent to the fuel metering valve in the fuel manifold (53). For example, when the equipment operator commands a heater output temperature set point that is higher than the current heater output temperature, the first control loop sees that the actual temperature is lower than the desired temperature and commands an increase to the gas turbine shaft speed. The second control loop then sees that the actual shaft speed is lower than the desired shaft speed and commands an increase in fuel flow. The increase in fuel flow then increases the gas turbine shaft speed and also increases the heater output temperature as desired.

The dual control loops described in FIG. 7 allow for more stable control of both the gas turbine engine and the gas turbine heater output. The gas turbine shaft speed has a fast response time to fuel metering command, and the heater output temperature has a slow response time to fuel metering command. The first control loop for heater output temperature may be tuned to a slower response time because effects of changes to gas turbine engine take more time to manifest in the heater output temperature. The second control loop for gas turbine shaft speed may be tuned to a faster response time such that both the shaft speed and heat output are maintained under changes to fuel pressure, fuel energy density, and ambient conditions.

The equipment operator may also specify air blower set point. If the equipment operator increases the air blower set point and maintains the temperature set point, the controller will increase the air blower speed such that more ambient air flows through the heater. This causes a decrease in the heater output temperature. The controller will then see that the heater output temperature is lower than the temperature set point and command an increase in fuel flow.

Still referring to FIG. 7, if the mixing plenum (42) does not properly mix the ambient air flow (35) and the gas turbine exhaust (21), the heater output temperature (712) may not be an accurate representation of the mixed-out heater output temperature, which means that the controller may be controlling to an incorrect temperature reading. This problem may be alleviated by installing a distributed array of two or more thermocouples at the heater outlet (44) such that the heater output temperature (712) represents an average of the measurements of the multiple thermocouples. The controller may then control to this average heater output temperature (712).

Figure 8:
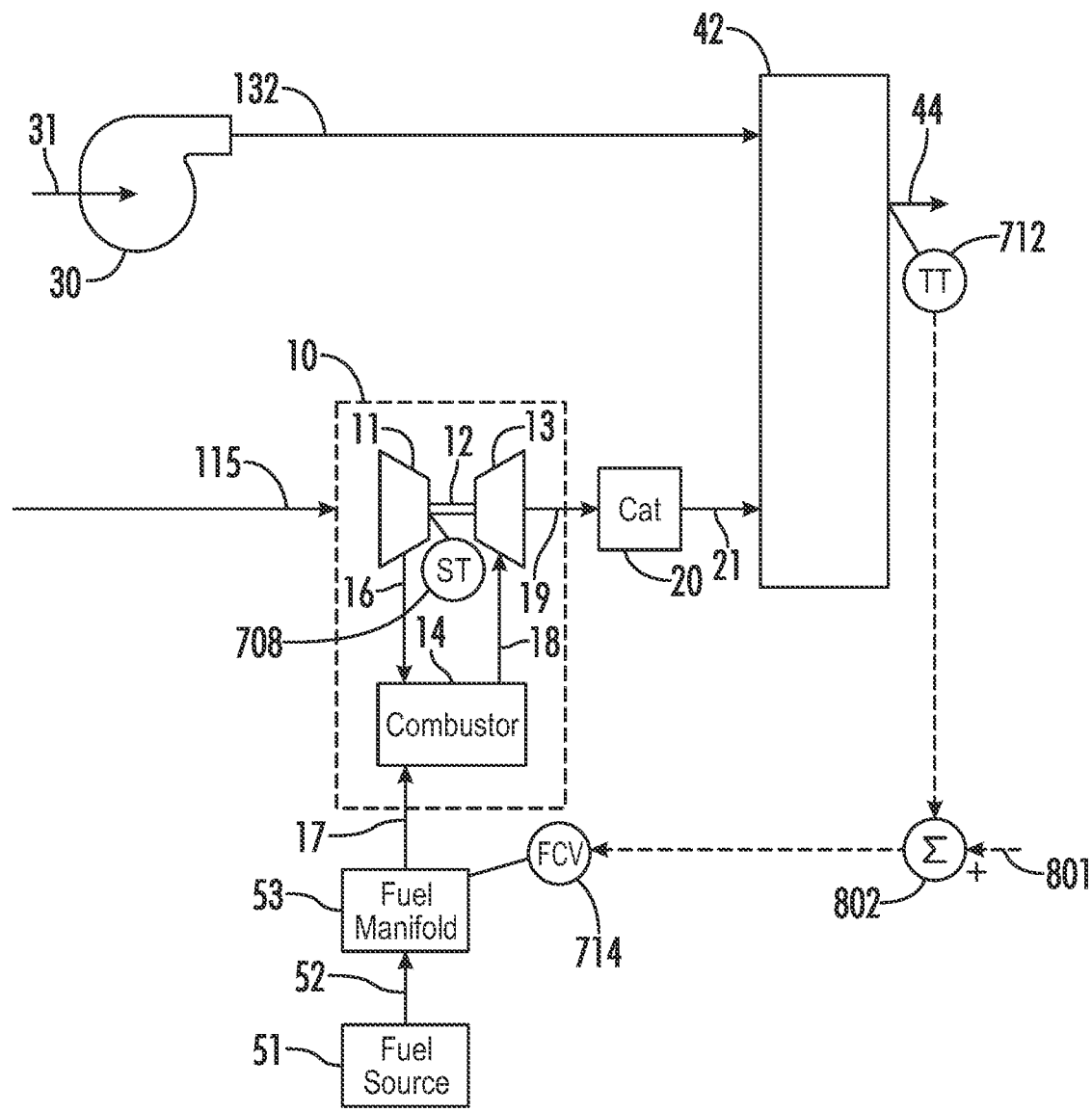
FIG. 8 Single control loop for a gas turbine heater, where the control loop controls for heater output temperature.

There are also other methods of controlling the gas turbine heater. In another method of controlling the gas turbine heater, refer to FIG. 8 for a controller that implements a single control loop on the heater output temperature instead of the dual control loops described in FIG. 7. The single control loop (808) receives a temperature set point (801) and the heater output temperature (712). The single control loop (808) uses some logic, for example PID control logic, to calculate a fuel metering command (714) based on the desired and actual heater output temperatures. The fuel metering command (714) is then sent to the fuel metering valve in the fuel manifold (53). The single control loop tends to be less stable than the dual control loops described in FIG. 7. The single control loop may also be less effective at controlling for perturbations that affect gas turbine heater behavior faster than the response time scale of the heater output temperature. These perturbations may include changes to fuel pressure, fuel energy density, ambient air temperature, and temporarily blockages to turbine air intake.

Figure 9:
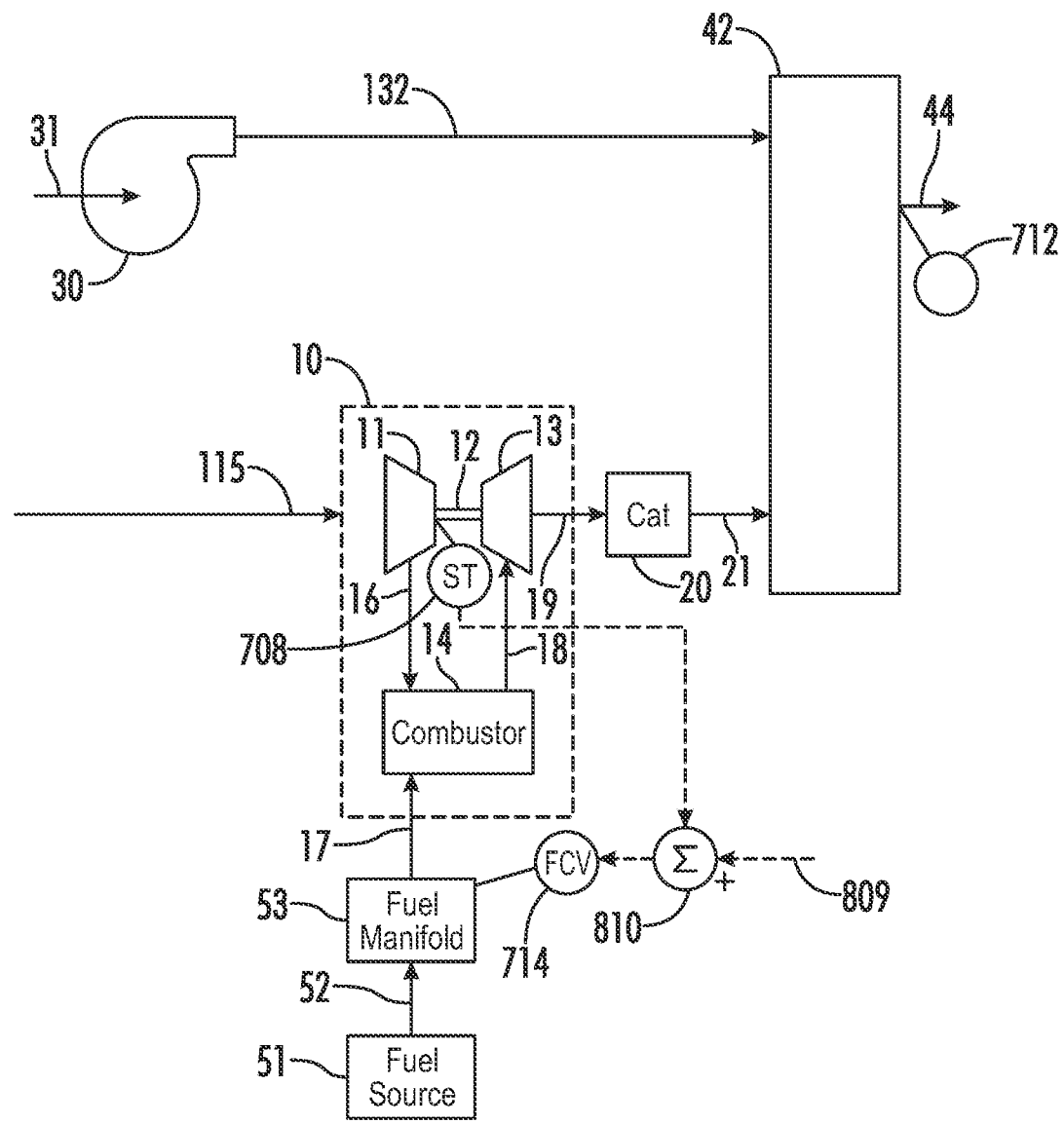
FIG. 9 Single control loop for a gas turbine heater, where the control loop controls for gas turbine shaft speed.

In another method of controlling the gas turbine heater, refer to FIG. 9 for a controller that implements a single control loop on the gas turbine engine parameter, such as gas turbine shaft speed, rather than on the heater output temperature. In this case, the single control loop (810) receives a gas turbine shaft speed set point (809) and the gas turbine shaft speed (708). The single control loop (810) uses some logic, for example PID control logic, to calculate a fuel metering command (714) based on the desired and actual gas turbine shaft speeds. The fuel metering command (714) is then sent to the fuel metering valve in the fuel manifold (53). This is the same as the second control loop described in FIG. 7. In this control method, the controller does not directly control the heater output temperature, but the operator may adjust the gas turbine speed set point to manually adjust the temperature. The air blower speed may also be adjusted to control the temperature, either manually by the operator or automatically via the controller.

For the method described in FIG. 9, instead of allowing the operator the adjust the gas turbine speed set point, it is also possible to automatically adjust the gas turbine speed set point based on a desired heater temperature set point, but not necessarily with closed-loop temperature control. Suppose that the customer wants a particular temperature output, the controller may evaluate the air flow rate and ambient temperature, and then calculate a gas turbine shaft speed that would result in that temperature output. The calculation can be done, for example, based on thermodynamics or based on test data that are summarized in a lookup table. If subsequently the air flow is reduced, the ambient temperature increases, or the customer reduces the temperature output, all of these situations result in an output temperature higher than the desired output temperature. Then the controller may reduce the gas turbine shaft speed, for example based on thermodynamic calculations or a lookup table, such that the output temperature tends back toward the temperature set point. The controller's internal memory may contain a look up table, from which the controller can determine the correct gas turbine speed set point based on the ambient temperature, air flow (via the blower set point), the temperature set point (either low/high, or a numerical value), and other parameters that may affect the gas turbine speed set point. This method does not provide closed-loop control over the heater output temperature, but the controller can still maintain heater output temperature within a reasonable range around the desired value. This may be useful when there is insufficient mixing in the mixing plenum such that it is difficult to accurately evaluate the heater output temperature.

In addition to parameters discussed so far that may be used in controlling the gas turbine heater, there are other parameters that may be useful for controlling or evaluating the performance of the gas turbine heater. Referring to FIG. 6, the controller (70) may evaluate a boost pressure signal (709) at the compressor exit (16), a fuel pressure signal (713) in the fuel manifold (53), and a heater output pressure signal (711). The boost pressure signal (709) is another indicator of gas turbine engine performance and usually increases monotonically with gas turbine shaft speed (708). The boost pressure signal may be used instead of gas turbine shaft speed in control algorithms, but gas turbine shaft speed measurement typically has better resolution and accuracy. The fuel pressure signal (713) may be used to determine fuel metering command (714). For example, a simple fuel metering valve may be a proportional valve that is driven by a PWM signal, and for a set PWM signal the fuel flow depends on fuel pressure. During ignition, it may be useful to determine the fuel metering command (714) based on the fuel pressure (713) such that the desired amount of fuel mass flow is delivered (17) into the combustor (14). The heater output pressure (711) may be used to evaluate the heater output flow rate and the back pressure on the heater output. The heater output pressure may increase due to an increase in output flow rate or due to an increase in back pressure. The back pressure may increase, for example, if the customer attaches a long hose or duct to the heater outlet.

Figure 10:
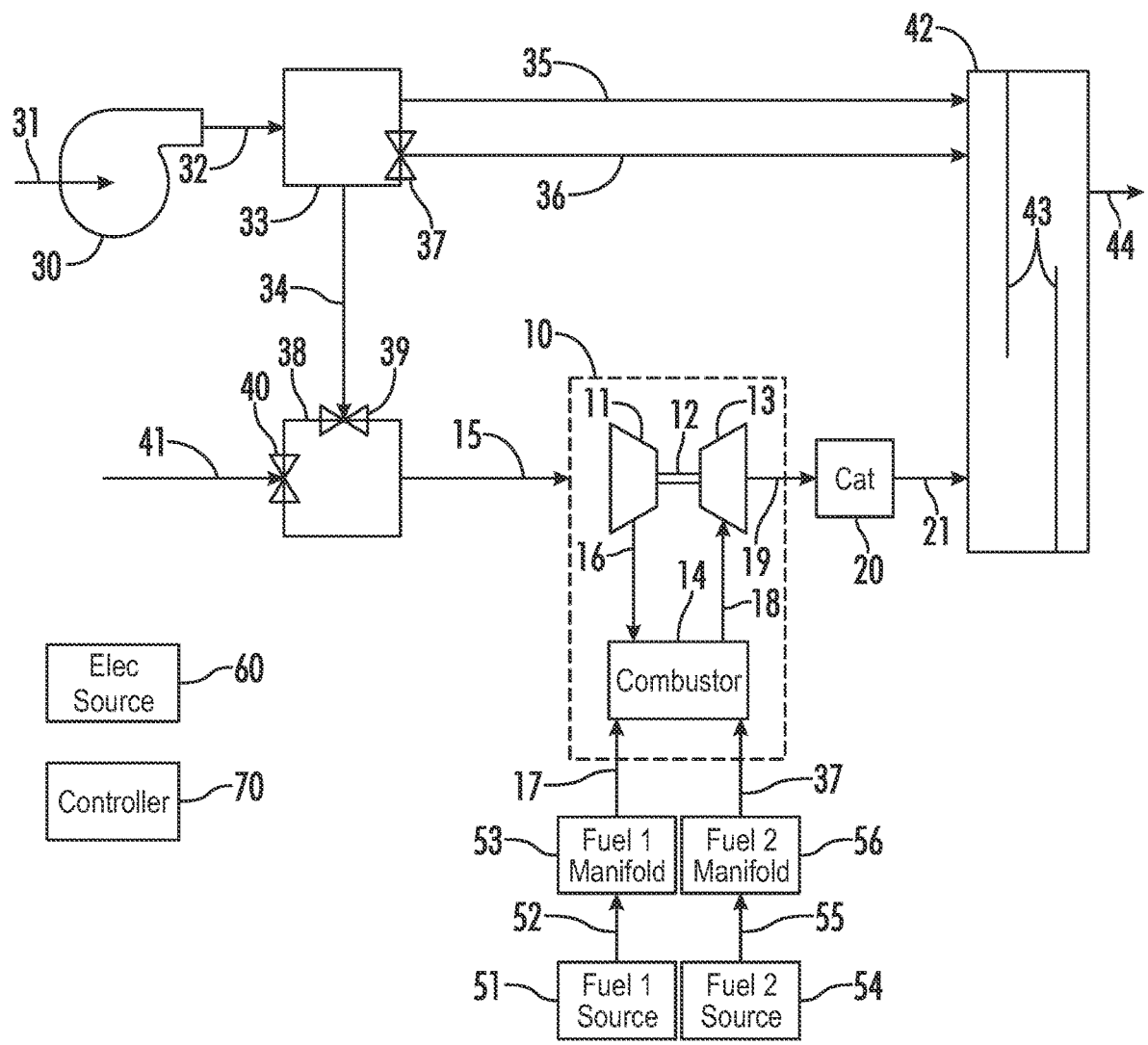
FIG. 10 A gas turbine heater with additional features that may improve the controllability or performance of the gas turbine heater.

Refer to FIG. 10 for a gas turbine heater with additional features that may improve the controllability or performance of the gas turbine heater. The air blower plenum (33) may have a third outlet flow path that delivers air flow (36) to the mixing plenum (42), but the third outlet flow path may be opened or closed by an air blower valve (37). This design may give greater control over the amount of starting air flow that is delivered to the gas turbine engine (10). When starting the gas turbine engine, the air blower valve (37) may be closed to reduce the amount of flow going to the mixing plenum (42). When the gas turbine engine is in self-sustaining operation and no longer receiving air from the air blower, the air blower valve (37) may be opened to provide another air flow path (36) to the mixing plenum (42). With an additional air flow path, the air blower may deliver greater mass flow to the mixing plenum (42) for the same amount of power. The mixing plenum (42) may contain baffles (43) that facilitate additional mixing between the air blower flow paths (35, 36) and the gas turbine exhaust (21). Without enough mixing, the heater output (44) may not have uniform temperature across the heater outlet flow area. The combustor may be a multi-fuel combustor that can concurrently burn multiple types of fuel. To take advantage of a multi-fuel combustor, a second fuel manifold (56) and a second fuel source (54) may be included in the gas turbine heater. One example of a multi-fuel combustor is a dual-fuel combustor that can burn gaseous hydrocarbon fuels (such as natural gas and propane) and diesel fuel. The dual-fuel combustor may have an air inlet, an air outlet, a gas fuel inlet, a liquid fuel inlet, and an igniter. A first fuel source (51) may be a pressurized propane tank, and a first fuel manifold (53) may include a pressure regulator and a metering valve. A second fuel source (54) may be a diesel tank, and a second fuel manifold (56) may include a fuel pump and a metering valve. The controller (70) may command a first fuel manifold (53) to receive propane (52) from a first fuel source (51) and deliver propane (17) to the combustor; the controller (70) may command a second fuel manifold (56) to receive diesel (55) from a second fuel source (54) and deliver diesel (57) to the combustor; the controller (70) may command both types of fuels to be delivered to the combustor at the same time.

Figure 11:
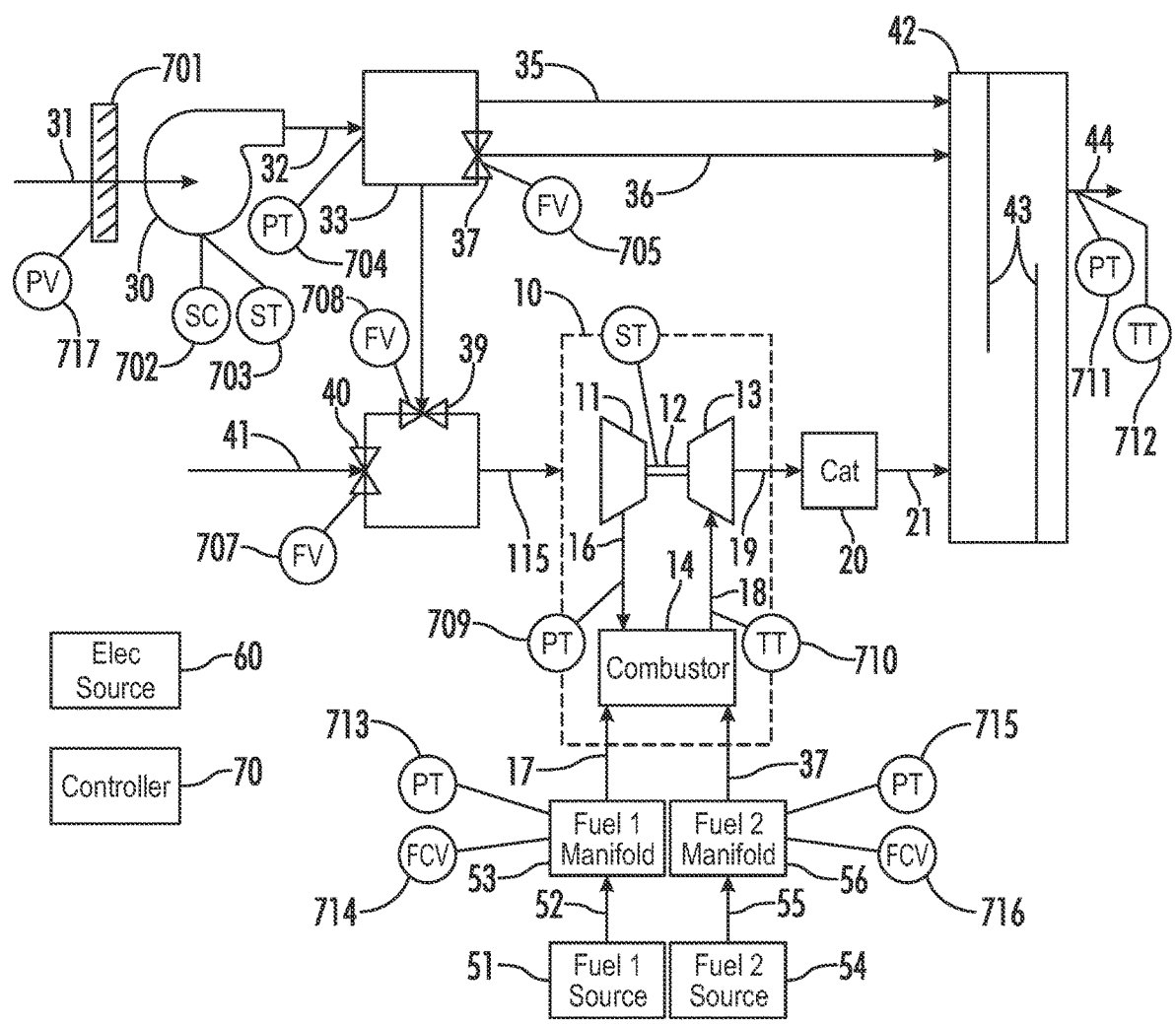
FIG. 11 A gas turbine heater with additional features that may improve the controllability or performance of the gas turbine heater, and control signals for the additional features.

Refer to FIG. 11 for a gas turbine heater with additional features that may improve the controllability or performance of the gas turbine heater, and control signals for the additional features. The air blower valve (37) may be a DC-motor-driven butterfly valve that receives an air blower valve command (705) such that the valve opens when receiving a positive voltage and the valve closes when receiving a negative voltage. If the gas turbine heater includes a dual-fuel combustor that can burn gaseous hydrocarbon fuels and diesel fuel, then the gas turbine heater may include two fuel manifolds to handle the two different fuels. A first fuel source (51) may be a pressurized propane tank, and a first fuel manifold (53) may include a pressure regulator and a metering valve. A second fuel source (54) may be a diesel tank, and a second fuel manifold (56) may include a fuel pump and a metering valve. The controller (70) may set a first fuel metering command (714) based on the propane pressure (713) or another parameter such that the desired amount of propane is delivered (17) into the combustor (14). The controller (70) may set a second fuel metering command (716) based on the diesel pressure (715) or another parameter such that the desired amount of diesel is delivered (57) into the combustor (14). The second fuel manifold (56) may also include a fuel pump (not shown) that receives a command (not shown) to draw diesel from the diesel tank (54) and deliver it at a higher pressure to the fuel metering valve in the second fuel manifold (56). The controller (70) may command both types of fuels to be delivered to the combustor at the same time.

The components of a gas turbine heater may be mounted on a trailer. The trailer may include a deck, fuel tank, one or more axles, and wheels. The resulting gas turbine heater mounted on a trailer is then towable and portable.

Indirect Fired Gas Turbine Heater

Figure 12:
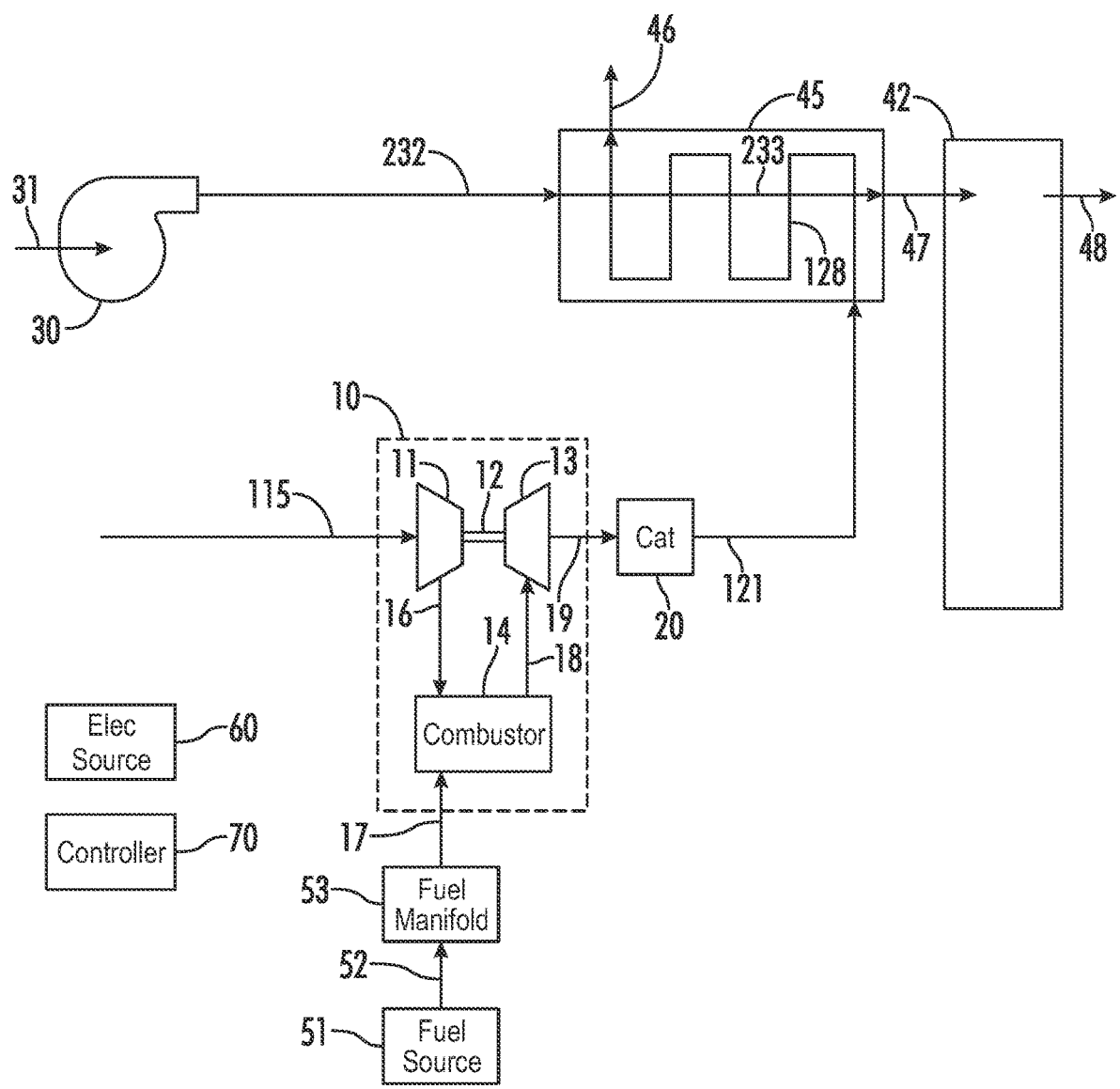
FIG. 12 An indirect fired gas turbine heater.

One embodiment of the present disclosure is an indirect fired gas turbine air heater. It is an air heater because it draws ambient air and heats up this ambient air. It is indirect fired because the gas turbine exhaust and ambient air go through separate flow paths of a heat exchanger such that the heat exchanger transfers heat from the gas turbine exhaust to the ambient air. Refer to FIG. 12, which shows an indirect fired gas turbine air heater. It has mostly the same components as a direct fired gas turbine air heater described in FIG. 1, but the mixing plenum of FIG. 1 has been replaced by a heat exchanger (45). The heat exchanger (45) has a cold air flow path (233) and a hot air flow path (122). The air blower (30) delivers ambient air (232) to the heat exchanger's cold flow path inlet. The ambient air travels through the cold air flow path (233), receives heat from the heat exchanger, and leaves the heat exchanger as warm air (47). The warm air may be delivered directly to the customer, or the warm air may enter an outlet plenum (49) before leaving the heater (48) as warm air at the heater outlet to the customer. The gas turbine engine (10) delivers hot exhaust gas (121) to the heat exchanger's hot flow path inlet. The exhaust gas travels through the hot air flow path (122), gives heat to the heat exchanger, and leaves the heat exchanger as exhaust (46) at a cooler temperature. One advantage of the indirect fired gas turbine air heater versus the direct fired heater is that the warm air delivered (48) to the customer does not contain any exhaust gases and should be completely breathable. In the direct fired gas heater, the exhaust gases mix with the ambient air, which means the warm air delivered to the customer may contain exhaust gases such as carbon monoxide and volatile organic compounds. The warm air from a direct-fired heater may or may not be breathable depending on whether the presence of these exhaust gases exceed permissible exposure limits.

Indirect Fired Gas Turbine Hydraulic Fluid Heater

Figure 13:
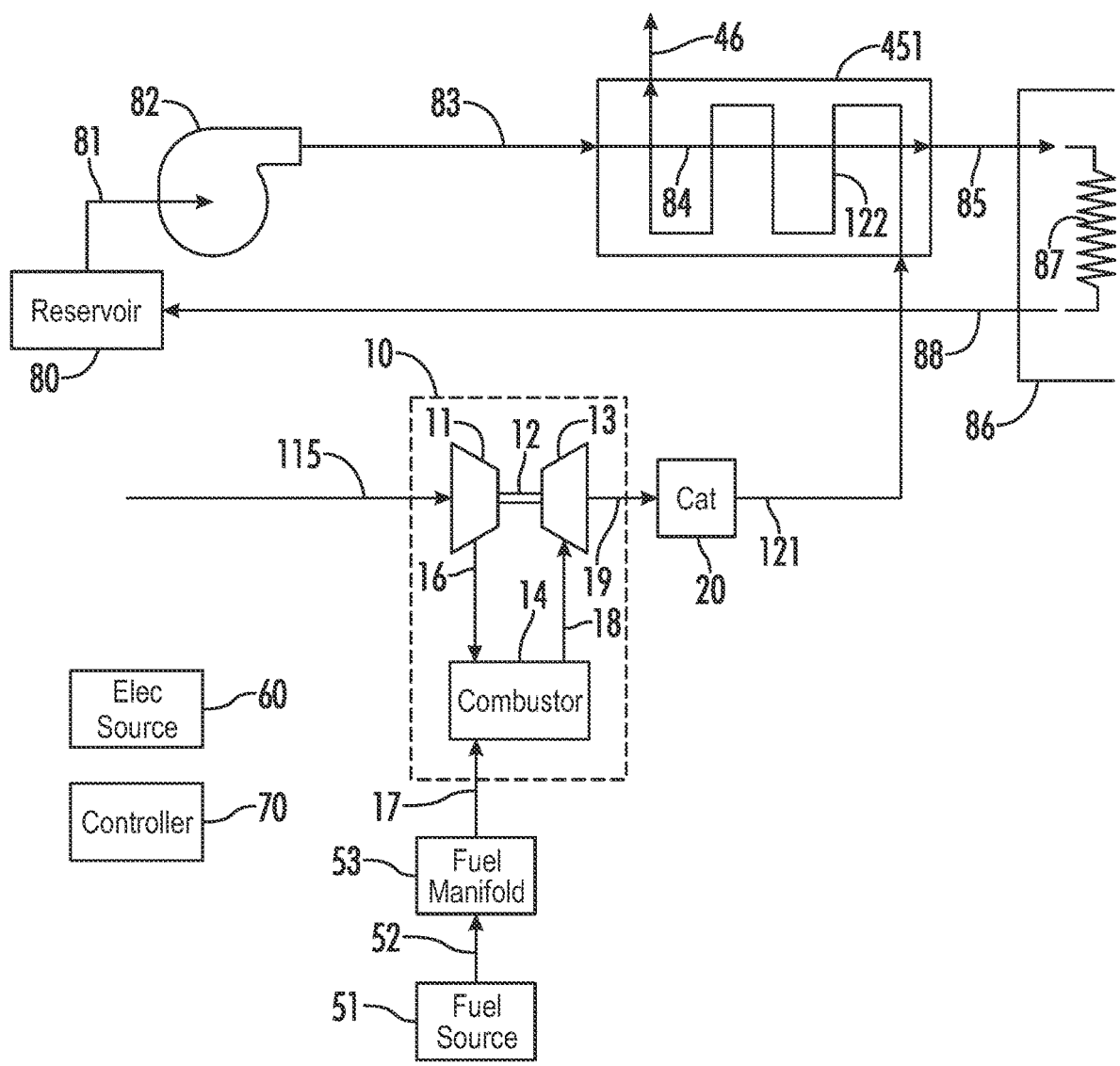
FIG. 13 An indirect fired gas turbine heater that heats up hydraulic fluid.

One embodiment of the present disclosure is an indirect fired gas turbine hydraulic fluid heater. It is a hydraulic fluid heater because it pumps hydraulic fluid, such as glycol, through a closed circuit and heats up the hydraulic fluid. It is indirect fired because the gas turbine exhaust and hydraulic fluid go through separate flow paths of a heat exchanger such that the heat exchanger transfers heat from the gas turbine exhaust to the hydraulic fluid. Refer to FIG. 13. The hydraulic fluid heater may have mostly the same components as an indirect fired gas turbine air heater described in FIG. 12, but instead of an air blower drawing ambient air flow into an air-to-air heat exchanger, a hydraulic pump (82) draws hydraulic fluid (81) from a hydraulic fluid reservoir (80), pumps hydraulic fluid (83) into an air-to-liquid heat exchanger (451), delivers heated hydraulic fluid (85) to the customer, and receives the same hydraulic fluid back (88) from the customer to be returned to the hydraulic reservoir (80). The heat exchanger (451) has a liquid flow path (84) and a hot air flow path (122). The hydraulic pump (82) delivers cold hydraulic fluid (83) to the heat exchangers liquid flow path inlet. The cold hydraulic fluid travels through the liquid flow path (84), receives heat from the heat exchanger, and leaves the heat exchanger as warm hydraulic fluid (85). The warm hydraulic fluid is delivered to the customer (86). The customer may use the warm hydraulic fluid in a heat exchanger (87), which draws heat out of the warm hydraulic fluid, and then returns the used hydraulic fluid (88) back to the heater. The heater receives the used hydraulic fluid (88) and returns it to the hydraulic reservoir (80). The gas turbine engine (10) delivers hot exhaust gas (121) to the heat exchanger's hot flow path inlet. The exhaust gas travels through the hot air flow path (122), gives heat to the heat exchanger, and leaves the heat exchanger as exhaust (46) at a cooler temperature.

Multi-Fuel Gas Turbine Engine

Figure 14:
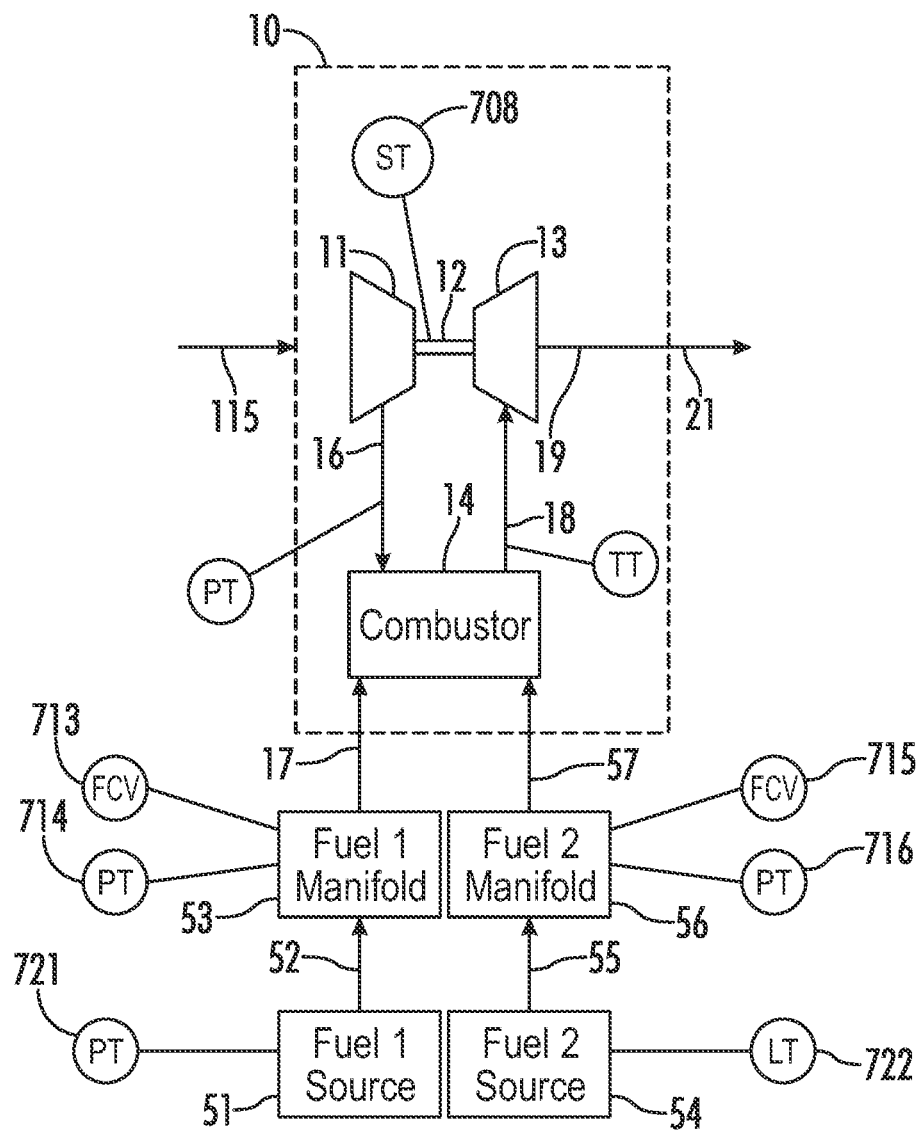
FIG. 14. A multi-fuel gas turbine engine having a multi-fuel combustor, a gaseous fuel manifold, and a liquid fuel manifold.

This disclosure teaches a multi-fuel gas turbine engine that can burn gaseous fuels and liquid fuels, and methods of controlling the multi-fuel gas turbine engine. Refer to FIG. 14 for one embodiment of a multi-fuel gas turbine engine. The gas turbine engine (10) includes a compressor (11) and a turbine (13) that are driven by the same shaft (12), and a multi-fuel combustor (14). The compressor (11) draws in air (15) from ambient and compresses the air. The compressed air is then delivered (16) to the combustor (14). The combustor (14) receives a gaseous fuel flow (17) and a liquid fuel flow (57) from different fuel sources. Note that the arrows representing fuel flow in FIG. 14 do not indicate the actual fuel injection points and are drawn only to indicate that two types of fuels flow into the combustor. The combustor may receive only one of the two fuel sources at any instance in time, or the combustor may receive both fuel sources at the same time. The one or both fuel sources mix with the air inside the combustor and forms an air-fuel mixture, which is ignited to create hot pressurized gas. The hot pressurized gas is delivered (18) to the turbine (13). The hot pressurized gas imparts energy to the turbine (13), which then drives the compressor (11) and completes the thermodynamic cycle. The hot pressurized gas leaves (19) the turbine as exhaust.

Still referring to FIG. 14, the combustor (14) receives fuel from multiple fuel sources. A gas fuel source (51) may contain gaseous hydrocarbon fuel, such as natural gas or propane, or some other gaseous combustible fuel. A gas fuel manifold (53) receives gaseous fuel (52) from the gas fuel source (51). The gas fuel source may be pressurized such that the gas fuel automatically flows into the gas fuel manifold. For example, the gas fuel source may be a compressed natural gas tank or a propane tank. The gas fuel manifold (53) may contain a fuel metering valve that delivers gaseous fuel into the combustor. The fuel metering value may be controlled by a fuel metering command (713). The gas fuel manifold may contain a pressure regulator that regulates the pressure inside the fuel manifold, and the gas fuel manifold may contain a pressure transducer (714) that monitors that pressure. The fuel metering command (713) may be calculated based on the pressure (714) inside the gas fuel manifold. The gas fuel source (51) may include a pressure transducer (721) inside or downstream of the gas fuel source that monitors the amount of gas fuel inside the gas fuel source.

Still referring to FIG. 14, a liquid fuel source (54) may contain liquid hydrocarbon fuel, such as diesel. For example, a liquid fuel source may be a diesel tank. A liquid fuel manifold (56) receives liquid fuel (55) from the liquid fuel source (54). For example, the liquid fuel source may include a fuel pump that draws liquid fuel from the liquid fuel source and delivers the liquid fuel to the liquid fuel manifold. Alternatively, the fuel pump may be a component of the liquid fuel manifold and draws liquid fuel from the liquid fuel source. The liquid fuel manifold may contain a fuel metering valve that delivers liquid fuel into the combustor. The fuel metering value may be controlled by a fuel metering command (715). Liquid fuels are typically delivered at a certain pressure, and that pressure may be monitored by a pressure transducer (716) in the liquid fuel manifold. The fuel metering command (715) may be calculated based on the pressure of liquid fuel (716) delivered by the liquid fuel manifold. The liquid fuel source (54) may include a level transducer (722) that monitors the amount of liquid fuel inside the source.

A controller (70) may monitor the sensors in the fuel manifolds and deliver commands to the fuel manifolds. The controller may also monitor and control the gas turbine engine. The gas turbine engine may have a speed sensor (708) that measures the gas turbine shaft speed, a pressure transducer (709) that measures the compressor outlet flow pressure, and a temperature sensor (710) that measures the combustor outlet flow temperature.

An important aspect of this system is the multi-fuel combustor. The multi-fuel combustor may have one inlet to receive air from the compressor, one inlet to receive gaseous fuel, one inlet to receive liquid fuel, an igniter (not shown in FIG. 14), and one outlet to deliver products of combustion to the turbine. It is advantageous for the multi-fuel combustor to be able to burn both gaseous and liquid fuels at the same time. This allows the multi-fuel combustor to burn either type of fuel, burn both fuels at the same time, and more easily transition from burning one type of fuel to another without disrupting the operating state of the gas turbine engine.

The controller may control the initial ignition of the multi-fuel gas turbine engine. In a simple case where the gas turbine engine is spooled up using only one type of fuel, the controller may set a fuel flow command during ignition such that a small amount of fuel sufficient for ignition is delivered to the combustor. The controller may then send a command to the igniter to ignite the air-fuel mixture inside the combustor. The controller may then increase the fuel flow command to gradually bring the gas turbine to steady operating state.

Figure 15:
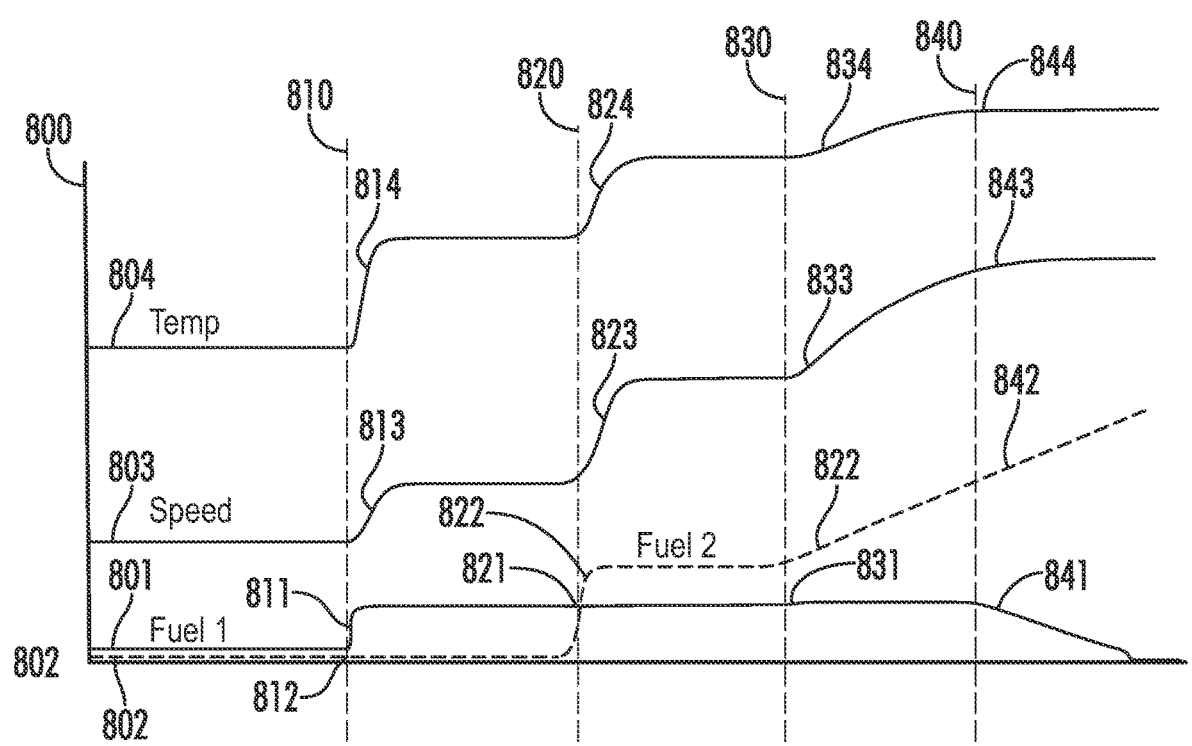
FIG. 15. One example of an ignition process for a multi-fuel gas turbine engine.

In another case where one fuel may be ignited more reliably than another, the controller may ignite one fuel as a pilot light and then transition to another fuel once combustion is achieved. For example, diesel fuel may not ignite as easily as gaseous fuel especially at low flow rates. Refer to FIG. 15, which describes how the controller may start ignition on gaseous fuel and then transition to liquid fuel. At the beginning of the process (800), there is a nominal gas turbine shaft speed (803) and a nominal turbine inlet temperature (804), but no fuel flow for either gaseous fuel (801) or liquid fuel (802). For example, the gas turbine engine may use an air starter, and at this time the air starter is turned on and the air flow spins the gas turbine engine, such that the shaft speed is some nonzero value and the turbine inlet temperature is approximately equal to the ambient temperature. At the first step (810), gaseous fuel is added (811) and the igniter is energized, which causes combustion to occur. The additional energy causes the gas turbine shaft speed to increase (813) and the turbine inlet temperature to increase (814). The controller may evaluate the increase in either speed or temperature to determine whether ignition was successful. At the second step (820), gaseous fuel is unchanged (821) and liquid fuel is added (822). Because there is already a flame inside the combustion chamber, it is easy to ignite the liquid fuel even for small amount of liquid fuel flow. The injection of liquid fuel then causes the gas turbine shaft speed to increase further (823) and the turbine inlet temperature to increase further (824). At the third step (830), liquid fuel is increased (832) and gaseous fuel is unchanged (831). This causes a further increase in gas turbine shaft speed (833) until a target speed is reached. For example, the target speed might be the idle speed of the gas turbine engine. The turbine inlet temperature typically also increases (834) at this step, but turbine inlet temperature may not always increase with increasing fuel. At the fourth step (840), gaseous fuel is ramped down (841) and liquid fuel is controlled (842) such that the target speed is maintained. During this period, the gas turbine shaft speed (843) remains close to the target speed, and the turbine inlet temperature (844) may not change significantly. At the end of this period, the gaseous fuel is no longer flowing and the engine is running completely on diesel fuel.

This method is advantageous if diesel fuel does not ignite reliably at low flow rates. Failed ignition attempts are not dangerous for gaseous fuels because gaseous fuels can be vented out of the gas turbine engine between attempts. Failed diesel ignition is more dangerous because diesel fuel injected during failed ignition attempts will pool up inside the combustor.

Figure 16:
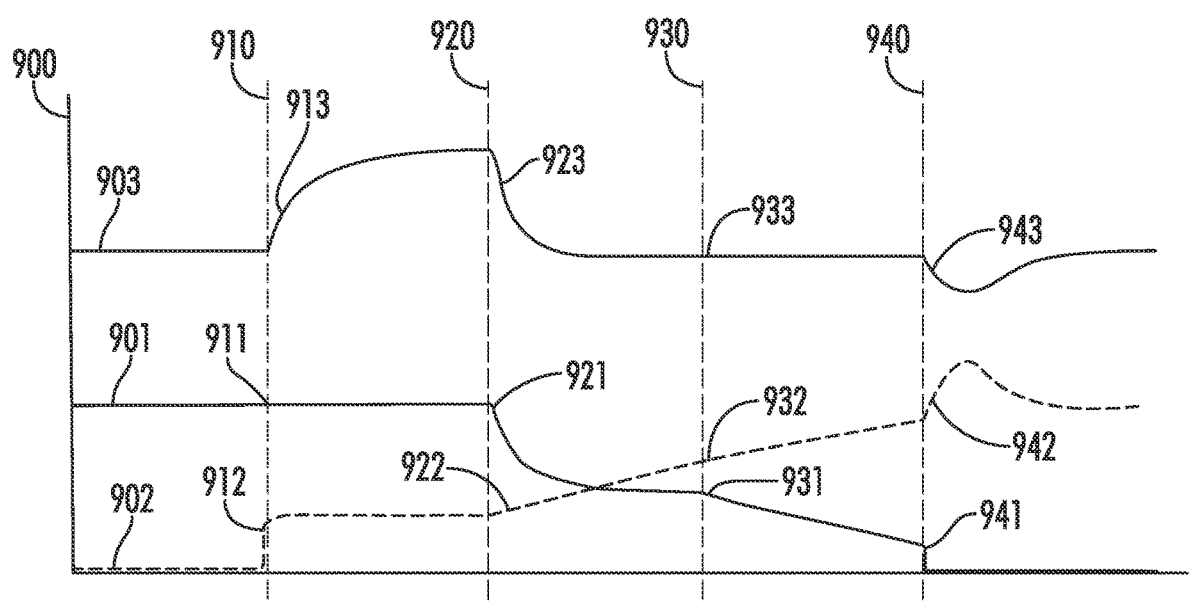
FIG. 16. One example of a fuel switch process for a multi-fuel gas turbine engine.

If the gas turbine engine is running at steady operating state on one fuel, the controller may switch the gas turbine engine to run on a different fuel without disrupting the operating state of the gas turbine engine. Refer to FIG. 16, which describes how the controller may switch the gas turbine engine from burning one fuel to another fuel.

At the beginning of the process (900), the gas turbine engine is operating at some steady state with a steady speed (903), a steady fuel flow for the first fuel (901), and no fuel flow for the second fuel (902). The fuel flow is typically controlled such that the desired operating state, such as the gas turbine shaft speed, is maintained. For example, the fuel flow may be controlled by a PID controller that meters fuel to maintain a specified gas turbine speed.

When the fuel switch is initiated (910), the fuel flow of the first fuel is fixed and a small amount of the second fuel is injected (912) into the combustor. This amount may be the same amount used during ignition. Fixing the first fuel flow and adding the second fuel causes a rise in gas turbine shaft speed (913). During this period, the controller may monitor an increase in gas turbine shaft speed to determine whether the fuel injection was successful. Turbine inlet temperature is not necessarily a convenient metric to use to determine successful fuel injection and combustion because temperature does not always increase with more fuel flow.

If the fuel injection was successful, then the next step (920) is to return the first fuel control to PID control and ramp up the second fuel (922). At the start of this step, the gas turbine shaft speed is greater than the original set point. Returning the first fuel control to PID control will cause the first fuel drop to drop (921) in response to the shaft speed being greater than the set point. The shaft speed will then drop (923) until it is equal to the original set point. During this time, the second fuel flow is continuing to increase, so the first fuel flow will automatically decrease to maintain the desired speed.

After some time in this process, the next step (930) changes the second fuel to PID control (932) and changes to first fuel to a gradual ramp down (931). This transition may be triggered by a condition related to efficacy of fuel injection. For example, if the first fuel is gaseous fuel and the second fuel is liquid fuel, the controller may transition liquid fuel from a gradual ramp up to PID control when the liquid fuel pressure reaches a certain value such that the liquid fuel nozzle achieves good atomization. Similarly, if the first fuel is liquid fuel and the second fuel is gaseous fuel, the controller may transition the first fuel from PID control to gradual ramp down when the liquid fuel pressure goes below the value at which the liquid fuel nozzle achieves good atomization.

After some time in this process, the last step (940) maintains PID control on the second fuel and shuts off the first fuel. When the first fuel is shut off (941), the gas turbine shaft speed drops (943) in response. The second fuel flow is commanded by the PID controller to increase (942) in response to the drop is gas turbine shaft speed, and eventually the second fuel flow settles to a flow rate that maintains the desired gas turbine speed. The transition into this last step may be triggered by a condition related to fuel flow rate. For example, if the first fuel is gaseous fuel and the second fuel is liquid fuel, the controller may cut off the first fuel at a certain valve command below which the first fuel flow is small enough to not cause a drastic drop in gas turbine shaft speed when the valve is instantaneously closed.

At this point, the fuel flow has switched completely from the first fuel to the second fuel. During the fuel switch process, the gas turbine engine operating point is maintained with no more than two small disturbances. Tuning the PID controller gains may reduce the duration and amplitude of these disturbances.

Figure 17:
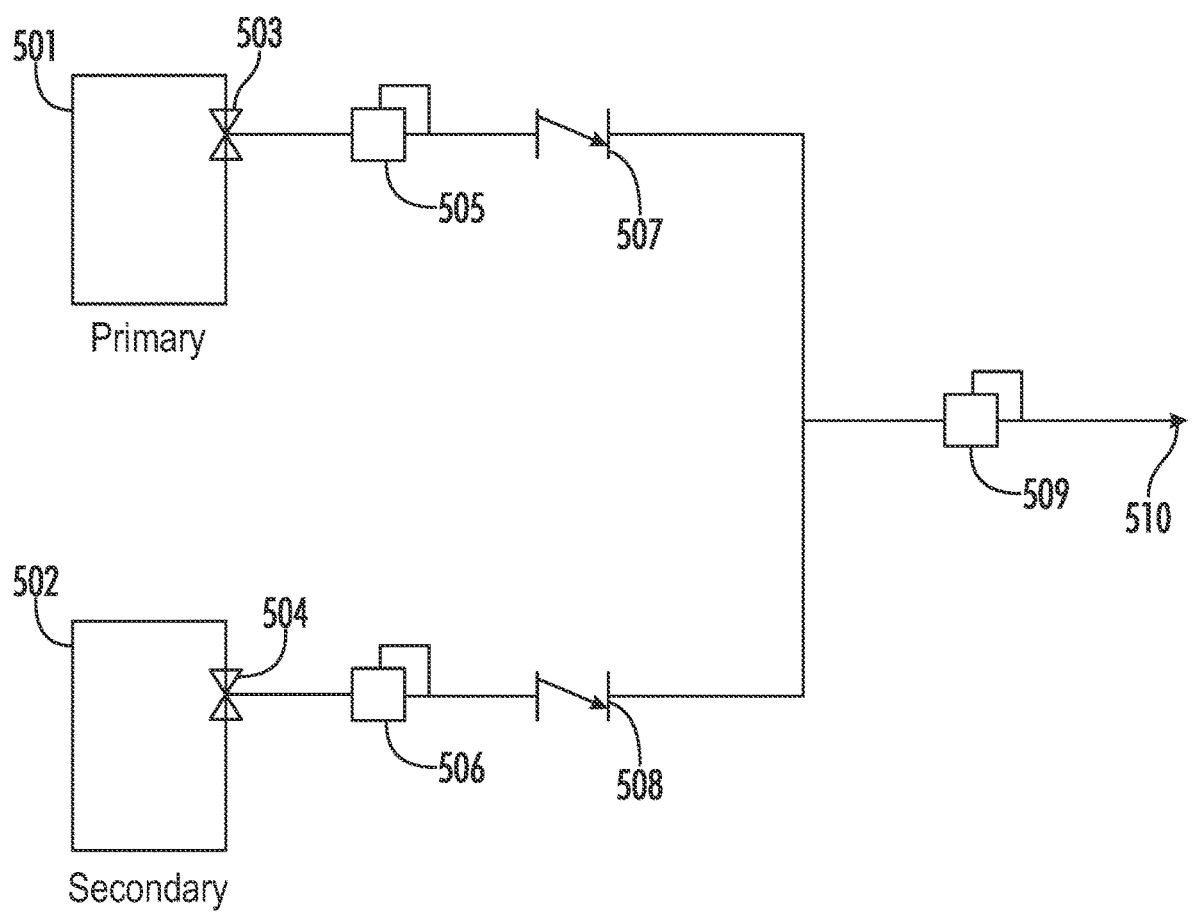
FIG. 17. A gaseous fuel manifold that receives more than one type of gaseous fuel.

The gas turbine engine's multi-fuel combustor may also burn multiple types of gaseous fuels. FIG. 17 shows an embodiment of two gas fuel sources that are connected together, and both gas fuel sources supply flow to the gas turbine engine. The primary gas fuel source (501) may be the preferred gaseous fuel source. In order to have a backup fuel source, a secondary gas fuel source (502) may also be included in the system. Each gas fuel source may have a corresponding shut off valve, pressure regulator, and check valve. The two sources of fuel combine into a single line that is fed (510) into a gas fuel manifold. Before feeding into a gas fuel manifold, there may be another pressure regulator (509). Alternatively, the pressure regulator (509) may be a part of the downstream gas fuel manifold.

Still referring to FIG. 17, this fuel source system may be used as follows. During normal operation, the primary fuel source shut off valve (503) and the secondary fuel source shut off valve (504) are both open. The primary pressure regulator (505) may be set to a higher pressure than the secondary pressure regulator (506). For example, the primary source may be a compressed natural gas (CNG) tank or pipeline and the pressure regulator may be set at 90 psig; the secondary source may be a liquified petroleum gas (LPG) tank and the pressure regulator may be set at 60 psig. When the primary fuel source (501) has sufficient capacity, the primary fuel will continue to flow through the primary pressure regulator (505) and the primary check valve (507) such that the pressure downstream of the check valves will be equal to the higher pressure of the primary regulator. The secondary fuel source (502) will flow fuel through the secondary pressure regulator (506), which operates at a lower pressure. The lower pressure upstream of the secondary check valve (508) cannot overcome the higher pressure on the other side of the check valve, so the secondary fuel will not flow further downstream into the gas turbine engine. When the primary fuel source (501) is running low on fuel, the pressure downstream of the primary regulator (505) will drop. When the pressure downstream of the primary regulator drops below the setting of the secondary pressure regulator (506), the secondary fuel will begin to flow across the secondary check valve (508) and flow downstream into the gas turbine engine. The downstream regulator (509) is not needed for this system to operate as described. However, the downstream regulator may help reduce pressure fluctuations when fuel source pressure suddenly changes.

Direct-Fired Gas Turbine Combined Heat and Power Unit

This disclosure also teaches a gas turbine heater that is a combined heat and power unit. In one embodiment, a gas turbine heater includes a gas turbine engine that generates power and hot exhaust gas, an air blower that is powered by the gas turbine engine and draws an amount of air flow from ambient, a mixing plenum that allows the gas turbine exhaust and ambient air flow to mix together to create warm air, an outlet that delivers the warm air to the customer, and exhaust gas diverters and electrical resistance heaters that provide additional control over the warm air output's flow rate and temperature.

Figure 18:
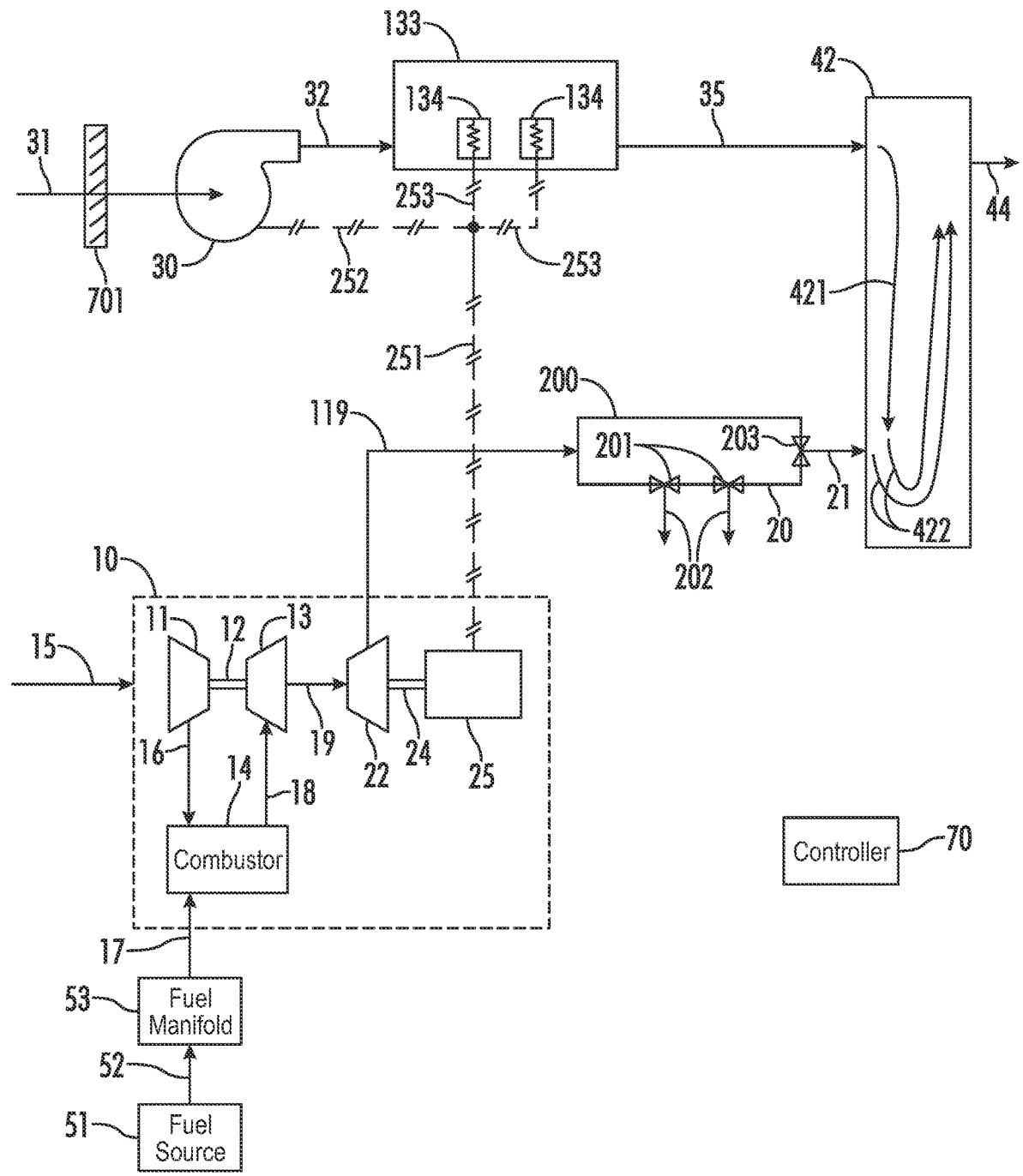
FIG. 18. A direct-fired gas turbine heater having power resistors and exhaust flow diverters to control balance of air flow and heat transfer, in which the power resistors are located outside the mixing plenum.

Refer to FIG. 18, which shows a direct-fired gas turbine heater. The gas turbine engine (10) includes a compressor (11) and a turbine (13) connected on a first common shaft (12), a combustor (14), and a second turbine (22) and a generator (25) connected on a second common shaft (24). The compressor draws air in (15) from ambient, compresses that air and delivers the compressed air (16) to the combustor. The combustor also receives fuel (17) from a fuel manifold (53), which receives fuel (52) from a fuel source (51). The fuel (17) and compressed air (16) mix inside the combustor and is ignited. The hot gases resulting from combustion are delivered (18) to the first turbine (13), impart energy to the turbine to drive the compressor, and exit the first turbine and is delivered (23) to the second turbine (22). The hot gases impart energy to the second turbine (22) to drive the generator (25), and exits the gas turbine engine as exhaust (119). The exhaust flows into a diverter plenum (200) that includes one or more flow diverter valves (201) and possibly a bypass valve (203). When the bypass valve (203) is open all the diverter valves (201) are closed, all of the exhaust flows (21) into a mixing plenum (42). When one or more of the diverter valves (201) are open, some of the exhaust is diverted (202) from the mixing plenum, and some of the exhaust flows into the mixing plenum.

Still referring to FIG. 18, the generator (25) produces electric power (251), which provides power (252) to an air blower (30). The air blower draws air in (31) from ambient, possibly through a louver (701), and delivers a volume flow of air (32) into a heating plenum (133). The louver may be partially closed to reduce the amount of air drawn by the air blower. The heating plenum includes one or more electrical heating elements (134). The electric power (251) produced by the generator may be used to power (253) the heating elements (134). The ambient air flowing into the heating plenum (133) passes over the heating elements (134) and increases in temperature. The air then exits the heating plenum and enters (35) the mixing plenum (42), and moves through the mixing plenum (421) until it meets the hot exhaust from the gas turbine engine. The two air flows travel together and mix (422) in the mixing plenum to create warm air (44) that leaves the mixing plenum and is delivered to the customer.

Still referring to FIG. 18, a controller (70) controls the operation of the gas turbine heater, including turning on the air blower, controlling fuel flow into the gas turbine engine, monitoring system performance, controlling the diverter valves in the diverter plenum, and controlling the heating elements in the heating plenum. In the gas turbine heater shown in FIG. 18, the electric power (251) produced by the generator (25) is used to drive the air blower and generate the air flow rate at the heater output (44); the fuel flow (17) into the gas turbine engine is used to create hot exhaust gas (21) and generate the temperature rise at the heater output (44). The air flow rate and temperature rise are related by a single degree of freedom in the system, which is the fuel flow. Additional degrees of freedom are needed to independently control flow rate and temperature at the heater output.

Still referring to FIG. 18, the diverter valves (201) and the heating elements (134) provide two additional degrees of freedom with which the controller (70) can independently control flow rate and temperature at the heater output. For the special case at gas turbine idle, the gas turbine is self-sustaining, but provides no electric power to the air blower, so the heater output is the exhaust gas which has low flow rate and very high temperature. In this case, it may be advantageous to have a bypass valve (203), close the bypass valve, and open the diverter valves (201) such that all of the exhaust gas is diverted from the mixing plenum, and no exhaust gas goes to the heater outlet. As the gas turbine engine is ramped up, electric power (252) is provided to the air blower (30) and the air blower generates air flow (35) going into the mixing plenum (42). At this point, the air flow is low and mixing all of the exhaust gas with the air flow will result in temperature that is too high for the customer at the heater outlet. Then it is advantageous to open the bypass valve (203) and leave one or more of the diverter valves (201) open. In this case, only some of the exhaust gas mixes with all of the air flow to generate warm air at the heater outlet. As the gas turbine engine is ramped up further, at a certain point the power generated by the gas turbine engine provides sufficient power to the air blower, which provides sufficient ambient air flow such that when all of the ambient air flow mixes with all of the exhaust gas, the resulting warm air at the heater outlet is at the desired temperature. In this case, the bypass valve (203) is open and all diverter valves (201) are closed. Further increase in gas turbine engine operating point, by adding fuel flow, will increase the air flow and reduce the outlet temperature. In this case, some of the electric power may be diverted from the air blower by activating one or more electric heating elements (134) in the heating plenum (133). This will reduce air flow without affecting heat input into the flow stream, and the overall effect is an increase in temperature back to the desired value.

The table below summarizes the 3 degrees of freedom that is built into the gas turbine heater of FIG. 18.

|                    | Air flow | Heat input | Temperature |
|--------------------|----------|------------|-------------|
| Turbine fuel flow  | ^^       | ^          | v           |
| Exhaust diverters  | —        | v          | v           |
| Heating elements   | vv       | —          | ^           |
| Air blower louver  | vv       | —          | ^           |

The first degree of freedom is the fuel flow. Increasing fuel flow increases power output, which increases air flow. It also increases heat input into the flow stream. However, the overall effect is a decrease in heater outlet temperature.

The second degree of freedom is the exhaust gas diverters. Opening the diverter does not significantly affect the air flow, which is primarily generated by the air blower. It does reduce the heat input into the flow stream. The overall effect is a decrease in heater outlet temperature.

The third degree of freedom is the electric heating elements. Activating the heating element diverts power away from the air blower, which reduces the air flow. It does not have a significant effect on heat input into the flow stream because the amount of power diverted from the air blower is a very small portion of the overall heat input from the fuel. The overall effect is an increase in heater outlet temperature. Note that the effect of heating elements on the heat input does depend on the thermal efficiency of the gas turbine engine and the relative electric and thermal power consumptions between the air blower and the gas turbine engine. For a typical example, a 15 kWe air blower generates sufficient air flow for the heater, and the required heat input to obtain the desired temperature rise may be 250 kWth. Therefore, diverting some amount of power from the air blower into a heating element is still a very small portion of the overall heat input.

The fourth degree of freedom is a louver at the air blower intake. Closing the louver reduces the air mass flow delivered by the air blower, but does not affect heat input into the flow stream. The overall effect is an increase in heater outlet temperature. The louver has a similar effect as the heating element, and it may be used in conjunction with or instead of the heating element.

At low flow rates, the air flow rate is low and the outlet temperature is normally too high, so diverters must be used to reduce heater outlet temperature. At high flow rates, the air flow rate is high and the outlet temperature may be too low, so either heating elements or louvers may be activated to reduce total air flow rate and increase heater outlet temperature.

The heating plenum may be a dedicated plenum with heating elements mounted in the plenum. The heating plenum may also be a simple duct that contains heating elements. The diverter plenum may be a dedicated plenum with multiple outlets, through each of which the gas turbine engine exhaust flow is controlled by a valve. The diverter plenum may also be a simple duct with multiple exits each controlled by a valve.

Figure 19:
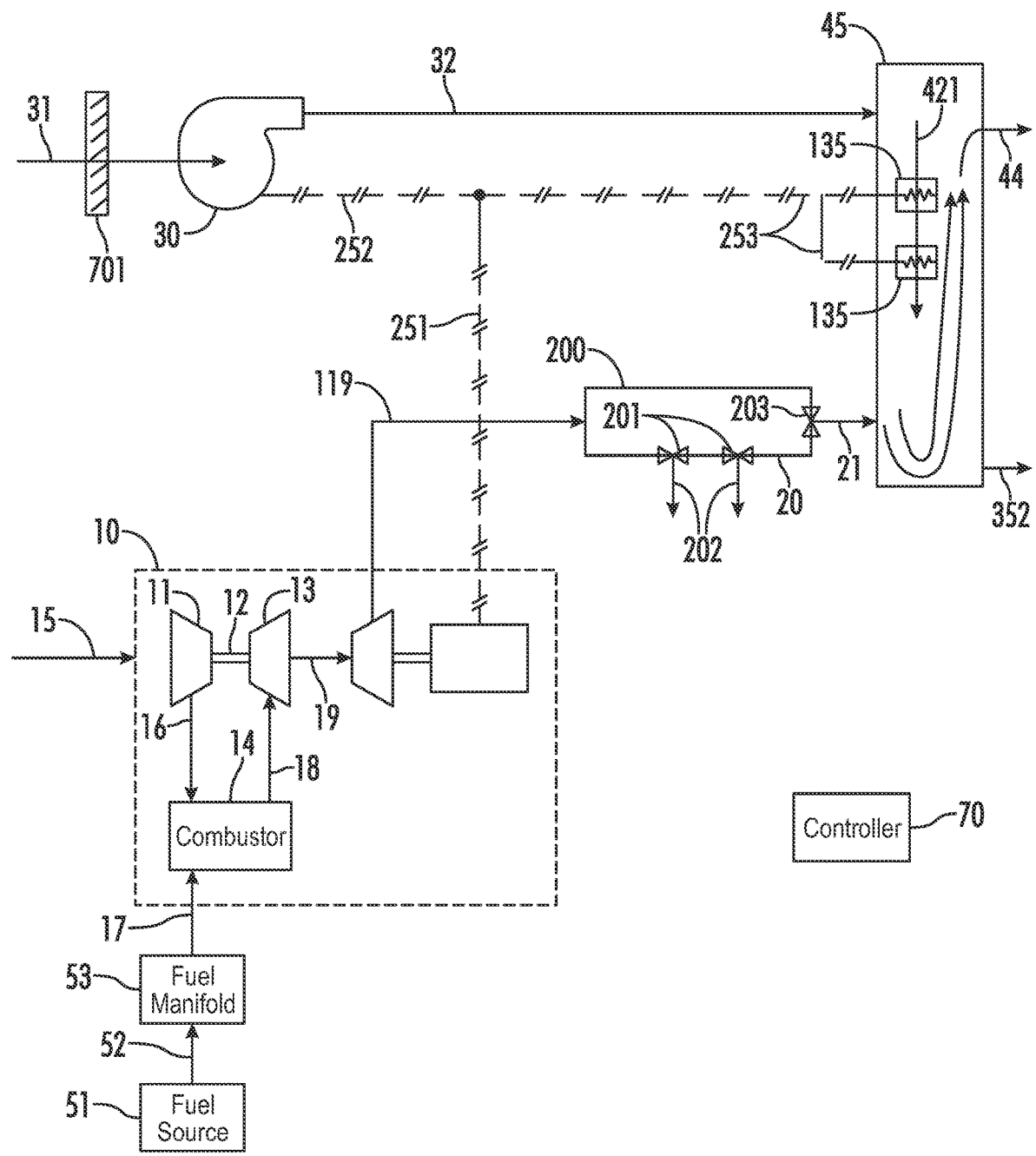
FIG. 19. A direct-fired gas turbine heater having power resistors and exhaust flow diverters to control balance of air flow and heat transfer, in which the power resistors are located inside the mixing plenum.

FIG. 19 shows another embodiment of a gas turbine heater. It is very similar to the gas turbine heater shown in FIG. 18. One difference is that the heating elements in FIG. 19 (135) are located inside the mixing plenum. The heating elements normally may be located before the gas turbine exhaust gas entrance to improve heat transfer. Putting heating elements after the gas turbine exhaust gas enters the mixing plenum may inhibit heat transfer and overheat the heating elements. The gas turbine heater output flow rate and temperature may be controlled the same way using fuel flow, diverter valves, heating elements, and air blower louver.

Indirect-Fired Gas Turbine Combined Heat and Power Unit

In another embodiment, a gas turbine heater that is a combined heat and power unit includes a gas turbine engine that generates power and hot exhaust gas, an air blower that is powered by the gas turbine engine and draws an amount of air flow from ambient, an air-to-air heat exchanger that transfers heat from the gas turbine exhaust to the ambient air flow to create warm air, an outlet that delivers the warm air to the customer, and devices such as flow diverters and electrical resistance heaters that provide additional control over the warm air output's flow rate and temperature.

Figure 20:
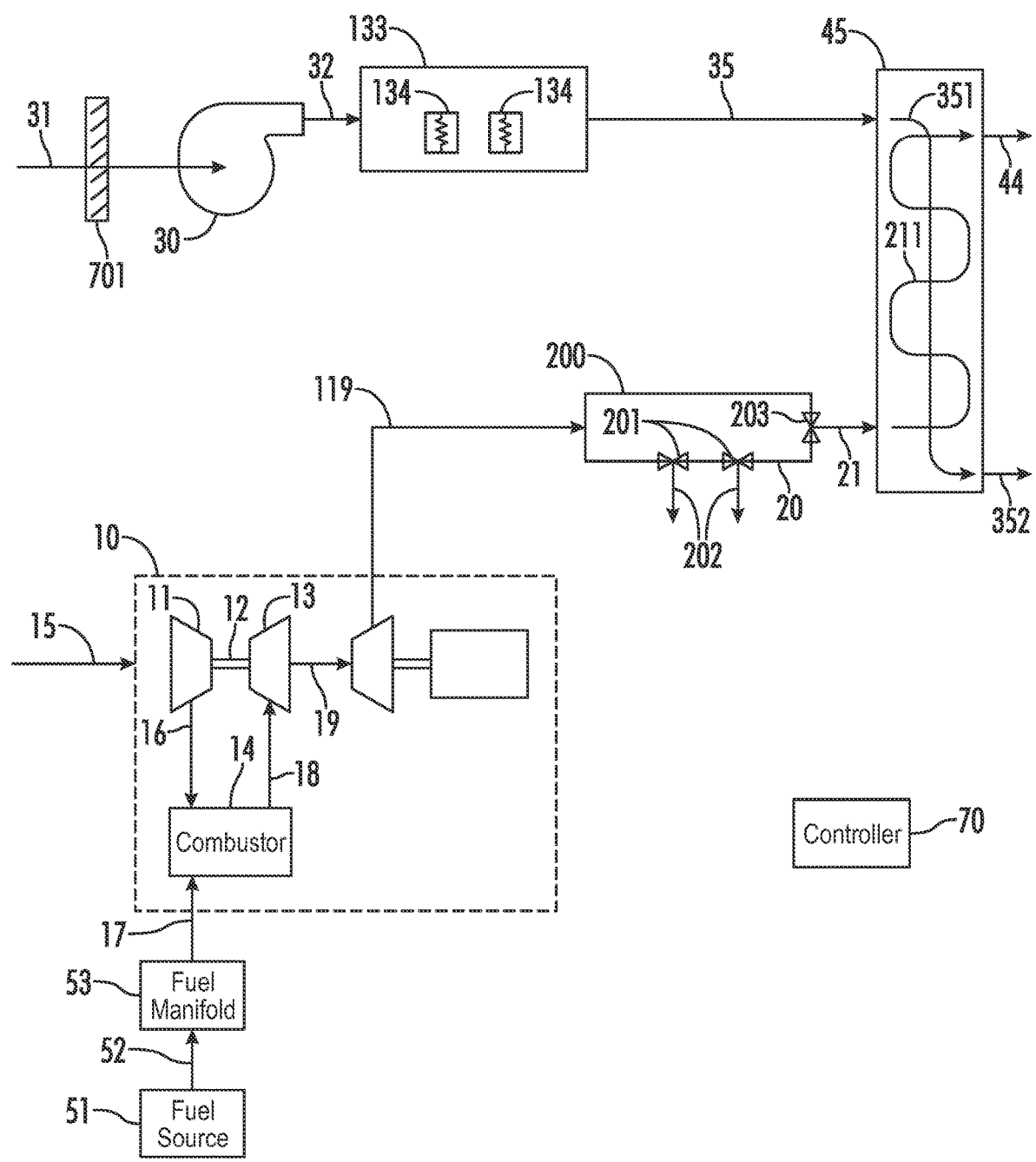
FIG. 20. An indirect-fired gas turbine heater having power resistors and exhaust flow diverters to control balance of air flow and heat transfer.

FIG. 20 shows an embodiment of an indirect-fired gas turbine heater. It is very similar to the gas turbine heater shown in FIG. 18. One difference is that the mixing plenum is replaced by a heat exchanger (45). Air from the air blower and heating plenum enters (35) the heat exchanger, flows through (351) the cold flow path of the heat exchanger, gains heat from the heat exchanger, exits the heater as warm air (352), and is delivered to the customer. The exhaust from the gas turbine engine and diverter plenum enters (21) the heat exchanger, flows through (211) the hot flow path of the heat exchanger, loses heat to the heat exchanger, and exits the heat exchanger as exhaust (212). The gas turbine heater output flow rate and temperature may be controlled the same way using fuel flow, diverter valves, heating elements, and air blower louver.

What is claimed is:

1. A direct-fired gas turbine heater comprising:
   (a) a gas turbine engine comprising:
      i) a compressor that receives cold air at a compressor inlet and delivers compressed air at a compressor outlet;
      ii) a fuel manifold that receives combustible fuel at a fuel manifold inlet and delivers fuel at a fuel manifold outlet;
      iii) a combustor that receives compressed air from the compressor outlet at a combustor air inlet; that receives fuel from the fuel manifold outlet at a combustor fuel inlet; that combusts the mixture of air and fuel inside the combustor with a combustor ignitor; and that delivers hot gas at a combustor air outlet;
      iv) a turbine that receives hot gas from the combustor outlet at a turbine air inlet; that extracts energy from the hot gas as the hot gas flows through the turbine; and that delivers hot gas at a turbine air outlet; and v) a shaft that connects the compressor and turbine, such that the energy extracted by the turbine is used to drive the compressor;

(b) a main air blower that receives cold air from ambient at a main air blower inlet and delivers cold air at a main air blower outlet;

(c) a mixing plenum having a cold air inlet that receives cold air from the main air blower outlet, a hot gas inlet that receives hot gas from the turbine, and a heater outlet that delivers warm air to the customer, wherein the cold air and hot gas mix within the mixing plenum to form warm air;

(d) an air blower plenum having an air blower plenum inlet that receives cold air from the main air blower, an air blower plenum starter outlet, and an air blower plenum main outlet that delivers air to the mixing plenum;

(e) an air intake plenum having an ambient air inlet that receives cold air from ambient, a starter air inlet that receives cold air from the air blower plenum starter outlet, and an air intake plenum outlet that delivers cold air to the compressor;

(f) an air intake valve that varies air flow across the ambient air inlet of the air intake plenum; and (g) an air starter valve that varies air flow across the starter air inlet of the air intake plenum.

2. The gas turbine heater of claim 1, further comprising a source of electrical power that drives the air blower.

3. The gas turbine heater of claim 2, wherein the source of electrical power is an electrical connector that receives power from a source of electrical power that is located outside the gas turbine heater.

4. The gas turbine heater of claim 2, wherein the source of electrical power is an electric generator located within the gas turbine heater.

5. The gas turbine heater of claim 1, further comprising:

(a) an air starter blower that is different from the main air blower and receives cold air from ambient at an air starter blower inlet and delivers cold air at an air starter blower outlet;

(b) an air intake plenum having an ambient air inlet that receives cold air from ambient, a starter air inlet that receives cold air from the air starter blower outlet, and an air intake plenum outlet that delivers cold air to the compressor; and (c) an air intake valve that varies air flow across the ambient air inlet of the air intake plenum.

6. The gas turbine heater of claim 1, wherein:

(a) the air blower plenum further comprises a second air blower plenum main outlet;

(b) the mixing plenum further comprises a second cold air inlet; and (c) the second air blower plenum main outlet is in fluid communication with the second cold air inlet of the mixing plenum; and further comprising:

(d) an air blower valve that varies air flow across the second air blower plenum main outlet.

7. The gas turbine heater of claim 6, further comprising:

(a) an air starter blower that is different from the main air blower and receives cold air from ambient at an air starter blower inlet and delivers cold air at an air starter blower outlet;

(b) an air intake plenum having an ambient air inlet that receives cold air from ambient, a starter air inlet that receives cold air from the air starter blower outlet, and an air intake plenum outlet that delivers cold air to the compressor; and (c) an air intake valve that varies air flow across the ambient air inlet of the air intake plenum.

8. The gas turbine heater of claim 7, further comprising:

(a) an engine sensor that measures a gas turbine engine parameter;

(b) a heater outlet sensor that measures a parameter of the warm air delivered to the customer at the heater outlet;

(c) a first controller that sets a desired gas turbine engine parameter in order to maintain a desired heater outlet parameter; and (d) a second controller that meters fuel delivered by the fuel manifold to the gas turbine engine in order to maintain the desired gas turbine engine parameter.

9. The gas turbine heater of claim 6, further comprising:

(a) an engine sensor that measures a gas turbine engine parameter;

(b) a heater outlet sensor that measures a parameter of the warm air delivered to the customer at the heater outlet;

(c) a first controller that sets a desired gas turbine engine parameter in order to maintain a desired heater outlet parameter; and (d) a second controller that meters fuel delivered by the fuel manifold to the gas turbine engine in order to maintain the desired gas turbine engine parameter.

10. The gas turbine heater of claim 1, further comprising one or more mixing devices that are situated within the mixing plenum.

11. The gas turbine heater of claim 1, further comprising:

(a) a sensor at the heater outlet that measures a parameter of the warm air delivered to the customer at the heater outlet; and (b) a controller that meters fuel delivered by the fuel manifold to the gas turbine engine in order to maintain a desired set point of the parameter of the warm air delivered to the customer at the heater outlet.

12. The gas turbine heater of claim 11, wherein the sensor measures heater outlet temperature and the controller meters fuel delivered by the fuel manifold to the gas turbine engine in order to maintain a desired heater outlet temperature.

13. The gas turbine heater of claim 1, further comprising:

(a) a sensor that measures a gas turbine engine parameter; and (b) a controller that meters fuel delivered by the fuel manifold to the gas turbine engine in order to maintain a desired set point of the gas turbine engine parameter.

14. The gas turbine heater of claim 13, wherein the sensor measures gas turbine shaft speed and the controller meters fuel delivered by the fuel manifold to the gas turbine engine in order to maintain a desired gas turbine shaft speed.

15. The gas turbine heater of claim 1, further comprising:

(a) an engine sensor that measures a gas turbine engine parameter;

(b) a heater outlet sensor that measures a parameter of the warm air delivered to the customer at the heater outlet;

(c) a first controller that sets a desired gas turbine engine parameter in order to maintain a desired heater outlet parameter; and (d) a second controller that meters fuel delivered by the fuel manifold to the gas turbine engine in order to maintain the desired gas turbine engine parameter.

16. The gas turbine heater of claim 1, further comprising:

(a) (a) a catalytic converter having an inlet in fluid communication with the turbine outlet and an outlet in fluid communication with the mixing plenum hot gas inlet.

17. An indirect-fired gas turbine heater comprising:

(a) a gas turbine engine comprising:

i) a compressor that receives cold air at a compressor inlet and delivers compressed air at a compressor outlet;

ii) a fuel manifold that receives combustible fuel at a fuel manifold inlet and delivers fuel at a fuel manifold outlet;

iii) a combustor that receives compressed air from the compressor outlet at a combustor air inlet; that receives fuel from the fuel manifold outlet at a combustor fuel inlet that combusts the mixture of air and fuel inside the combustor with a combustor ignitor; and that delivers hot gas at a combustor outlet;

iv) a turbine that receives hot gas from the combustor outlet at a turbine air inlet that extracts energy from the hot gas as the hot gas flows through the turbine; and that delivers hot gas at a turbine air outlet; and v) a shaft that connects the compressor and turbine, such that the energy extracted by the turbine is used to drive the compressor;

(b) an air starter blower that receives cold air from ambient at an air starter blower inlet and delivers cold air at an air starter blower outlet;

(c) an air intake plenum having an ambient air inlet that receives cold air from ambient, (d) a starter air inlet that receives cold air from the air starter blower outlet, and an air intake plenum outlet that delivers cold air to the compressor;

(e) an air intake valve that varies air flow across the ambient air inlet of the air intake plenum;

(f) a hydraulic fluid reservoir;

(g) a hydraulic fluid pump;

(f) a heat exchanger comprising:

i) a liquid flow path having a cold fluid inlet that receives cold fluid from the hydraulic fluid pump, the cold fluid gains heat within the heat exchanger to become warm fluid, and a heater fluid outlet that delivers this warm fluid to the customer; and ii) a hot flow path having a hot gas inlet that receives hot gas from the turbine, the hot gas loses heat within the heat exchanger, and a hot gas outlet that exhausts hot gas to ambient; and (h) a heater fluid inlet that receives fluid from the customer and returns the fluid to the hydraulic fluid reservoir.

18. The indirect-fired gas turbine heater of claim 17, further comprising:

(a) a sensor that measures a gas turbine engine parameter; and (b) a controller that meters fuel delivered by the fuel manifold to the gas turbine engine in order to maintain a desired set point of the gas turbine engine parameter.

19. The gas turbine heater of claim 18, wherein the sensor measures gas turbine shaft speed and the controller meters fuel delivered by the fuel manifold to the gas turbine engine in order to maintain a desired gas turbine shaft speed.

20. The indirect-fired gas turbine heater of claim 17, further comprising a main air blower that receives cold air from ambient at a main air blower inlet and delivers cold air at a main air blower outlet.

* * * * *

UNITED STATES PATENT AND TRADEMARK OFFICE
CERTIFICATE OF CORRECTION

PATENT NO. : 11,680,522 B2
APPLICATION NO. : 16/945063
DATED : June 20, 2023
INVENTOR(S) : Jason How-Ring Ethier, German Lakov and Ivan Wang It is certified that error appears in the above-identified patent and that said Letters Patent is hereby corrected as shown below:

In the Claim

In Claim 17, Column 23, Line 10, after "combuster fuel inlet", insert -- , --.

In Claim 17, Column 23, Line 15, after "turbine air inlet", insert -- , --.

Signed and Sealed this
Eighteenth Day of July, 2023

Katherine Kelly Vidal
*Director of the United States Patent and Trademark Office*